United States Patent [19]

Takeyasu et al.

[11] 3,984,006
[45] Oct. 5, 1976

[54] AUTOMATIC ASSEMBLY CONTROL SYSTEM

[75] Inventors: Kiyoo Takeyasu, Tokorozawa; Tatsuo Goto, Tokyo; Tadao Inoyama, Yokohama; Takeshi Tokunaga, Hitachi; Osamu Isoo, Hitachi; Shigeru Matsuoka, Hitachi, all of Japan

[73] Assignee: Hitachi, Ltd., Japan

[22] Filed: Jan. 31, 1975

[21] Appl. No.: 546,131

[30] Foreign Application Priority Data

| Feb. 1, 1974 | Japan | 49-12745 |
| Nov. 8, 1974 | Japan | 49-128794 |
| Nov. 8, 1974 | Japan | 49-128795 |
| Nov. 8, 1974 | Japan | 49-128796 |
| Nov. 8, 1974 | Japan | 49-128797 |
| Nov. 15, 1974 | Japan | 49-132425 |
| Nov. 15, 1974 | Japan | 49-132426 |
| Nov. 15, 1974 | Japan | 49-132427 |
| Nov. 15, 1974 | Japan | 49-132428 |

[52] U.S. Cl. ............ 214/1 BB; 235/151.1; 235/150.1
[51] Int. Cl.² ............ B25J 3/00
[58] Field of Search ............ 214/1 CM; 235/151.11

[56] References Cited
UNITED STATES PATENTS

| 3,550,630 | 12/1970 | Panissidi | 137/624.18 |
| 3,770,140 | 11/1973 | Dukette | 214/1 CM |

OTHER PUBLICATIONS

"Methods and Instruments–Underwater Manipulator with Automatic Electronic Computer Control" in Oceanology (USA), vol. 11, No. 3, 1971, pp. 420–425.

Primary Examiner—Eugene G. Botz
Attorney, Agent, or Firm—Craig & Antonelli

[57] ABSTRACT

In an automatic assembly control system, a flexible coupling mechanism deformable in accordance with the relative positions of an object and a hole to receive the object therein and a detector to detect the displacement or the deformation of the coupling mechanism in the direction of insertion in excess of a certain value are provided so that in the process of inserting the object into the hole the distance between the object and the hole in the direction perpendicular to the direction of insertion is controlled in accordance with the output of the detector.

15 Claims, 55 Drawing Figures

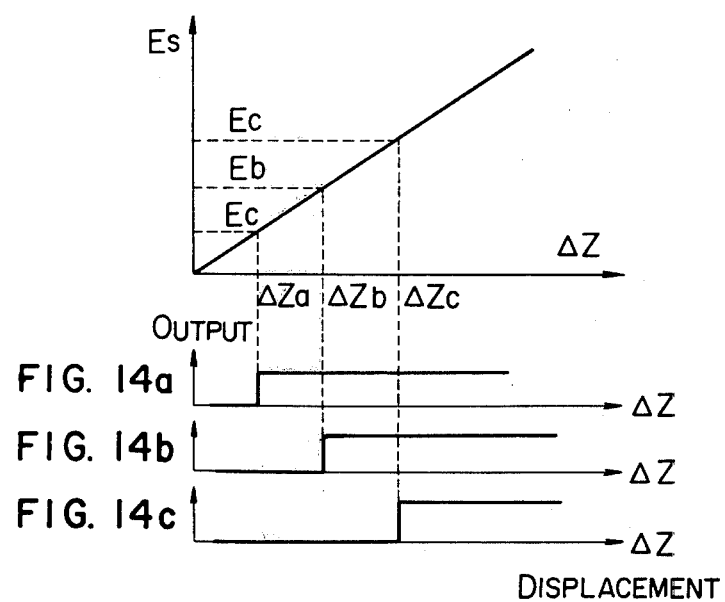
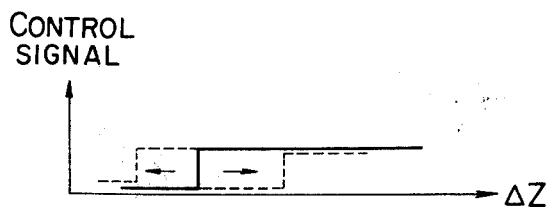

→ lz

AUTOMATIC ASSEMBLY CONTROL SYSTEM

BACKGROUND OF THE INVENTION

1. Field of the Invention

The present invention relates to the structure of an apparatus and to a system for controlling the apparatus, the apparatus automatically performing the operation of inserting an object into a bore prepared for receiving the object.

2. Description of the Prior Art

Generally, in an automatic assembly control system, there are included a variety of operations for inserting parts into the predetermined bores or holes. Among them the inserting operation for minute parts or parts having complex shapes with high accuracy cannot be automatized without encountering great difficulties so that the operation has been an obstacle to be surmounted in saving man's power in assembly process.

SUMMARY OF THE INVENTION

The object of the present invention is to realize with a comparatively simple apparatus and control system the automatization of such an inserting operation as has hitherto been regarded as very difficult.

According to one of the features of the present invention which has been made to attain the above object, therefore, an assembling apparatus having a positioning mechanism and a holding mechanism and a flexible mechanism between them, is used, whereby an inserting operation with a pressure less than a predetermined value in the direction of insertion is performed; a search motion in the direction perpendicular to the direction of insertion, following an adequate search pattern is initiated by the positioning mechanism when the object to be inserted is detected in the restricted condition; and the inserting operation is resumed after the position at which the restriction is released has been detected.

Other objects and features as well as advantages, of the present invention will be apparent when one reads the following detailed description of the specification in conjunction with the accompanying drawings.

BRIEF DESCRIPTION OF THE DRAWING

FIGS. 13, 14a, 14b, 14c and 15 are diagrams useful for explaining the operation of the device shown in FIG. 11.

DESCRIPTION OF THE PREFERRED EMBODIMENTS

Figure 1:
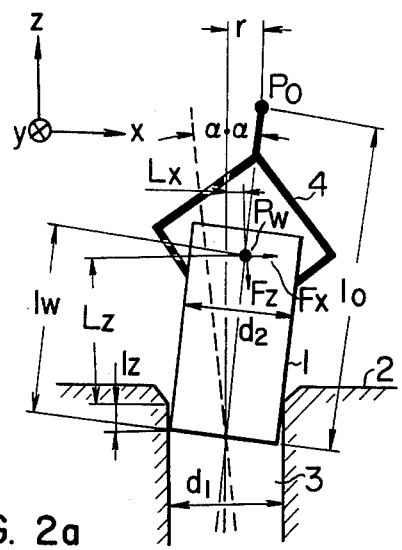
FIG. 1 illustrates the principle of the present invention.

FIG. 1 shows a case where a cylindrical object such as a shaft is inserted into a bore, in which $P_W$ indicates the center of gravity of the rigid body system including the object 1 and a holding mechanism 4 while $P_0$ is a point at one end of the rigid body system, on the center line of the system. In this case, the shaft received in the bore can incline within an angle of $\alpha$ in the bore, the angle $\alpha$ being such that $$\alpha = \tan^{-1} \sqrt{\frac{l_2{}^2 + d_1{}^2 - d_2{}^2}{d_2{}^2}} - \tan^{-1} lZ/d_1 \qquad (1)$$

Since the inclination is arbitrary in the x- and y-directions, the point $P_0$ can move freely in the x–y plane within a region having a radius of $r$ such that $$r \doteq lo \sin \alpha \qquad (2)$$

Conversely, even if $P_0$ is deviated from the center line of the bore, the shaft can be inserted into the bore without restriction up to a depth $lZ$ determined by the formulae (1) and (2) only if the shaft can be freely inclined.

In order to insert the shaft to a greater depth in the bore, the following conditions are required. Namely, in FIG. 1, when further inserting pressure is applied to the shaft by the positioning mechanism so as to move the point $P_0$ toward $-z$ direction, $P_0$ tends to displace in the $-x$ direction so that a counter force in the $x$ direction is generated. If it is assumed that the inserting pressure $P_z$ and the counter force $F_x$ are both applied to the shaft at the center of gravity, the condition that the further insertion of the shaft is possible is given by the following formula.

$$\frac{F_x}{F_z} \leq \frac{\frac{L_z}{Z - \mu d_1}(\mu + K) + K}{1 - \frac{L_z}{L_z - \mu d_1}(\mu + K)} \qquad (3)$$

where $$K = \frac{\sin \alpha + \mu \cos \alpha}{\cos \alpha - \mu \sin \alpha}$$

and $\mu$ is the friction coefficient between the shaft and the bore surfaces. Hence, if $F_x$ is sufficiently smaller than $F_z$, the shaft can be inserted to greater depth even if it is at the critical inclination. Accordingly, if the shaft can be inclined and if the point $P_0$ can be displaced in the $x$- and $y$-directions, then the shaft can be inserted beyond the depth determined by the formulae (1) and (2) up to the limit determined by the formula (3).

According to the present invention, the above mentioned condition for the deeper insertion is fulfilled to a certain extent by the flexible mechanism and that part of the condition which cannot be met by the characteristic of the flexible mechanism alone is satisfied only by a sensor which detects the relative displacement of the flexible mechanism in the direction of insertion ($z$ direction).

Figure 2A:
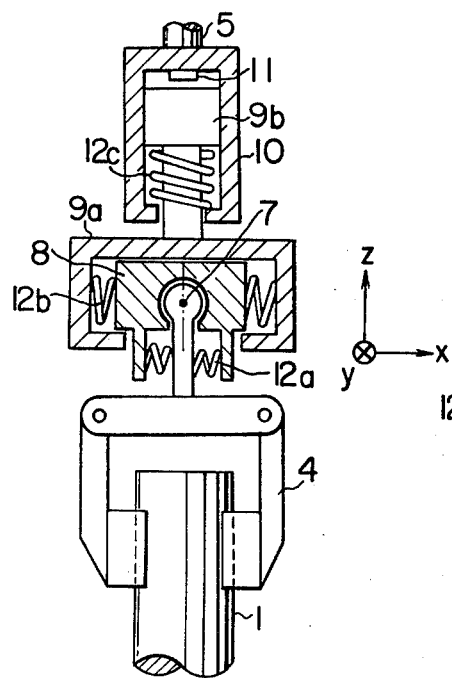
FIGS. 2a and 2b show examples of a flexible or elastic mechanism applicable to the present invention.

FIG. 2 shows the structures of exemplary flexible mechanisms used and referred to, in the present invention. In FIG. 2a is shown a flexible mechanism which can move in the $x$-, $y$- and $z$-directions and allow its axis to incline, the movements and the inclination being independent of one another. Namely, the object holding mechanism 4 can be freely inclined within a predetermined angle by means of, for example, a ball-and-socket joint. A spring means 12-a may be incorporated to give restorative force. A member 8 can move in the $x$- or $y$-direction relative to another member 9 to move in the $z$-direction, and may be provided with a spring means 12-b if necessary. The member 9 can move in the $z$-direction relative to a base member 10 fixed to the end 5 of the positioning mechanism (not shown) capable of moving in the $x$-, $y$- and $z$-directions, and the member 9 is provided with a spring means 12-c. The spring means 12-c not only gives restorative force but also provides the following merits.

1. By supporting the flexible mechanism elastically in the $z$-direction the relative displacement proportional to the external force applied in the $z$-direction can be produced so that the external force in the direction of insertion can be exactly detected.

2. By supporting the object to be inserted and the holding mechanism in a balanced condition in the case where the $z$ axis is vertical, the above item (1) can be realized.

Figure 2B:
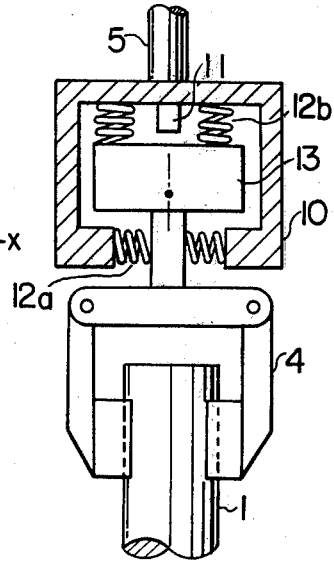

As described above, the flexible mechanism according to the present invention can be defined as an apparatus capable of moving in the $x$-, $y$- and $z$-direction and inclining with respect to the $z$ axis. However, in some cases, such a mechanism need not independently move in the $x$-, $y$- and $z$-direction and incline with respect to the $z$ axis, but may have such a structure as shown in FIG. 2b. In FIG. 2b, a movable member 13 fixed to the holding mechanism 4 can relatively move and displace with respect to the base member 10 by means of a spring means 12.

Figure 3A:
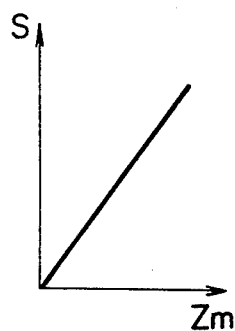
FIGS. 3a–3c show the characteristics of sensors for detecting the pressure of inserting the objects, used in the mechanism shown in FIG. 2.
Figure 3B:
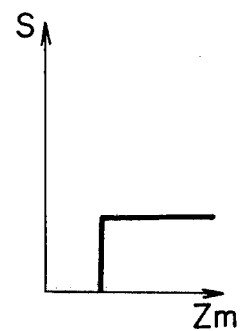
Figure 3C:
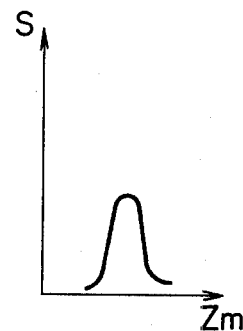

In the operation of inserting scattered objects into their proper holes, that is, in the inserting operation in which there are initial deviations of the positions of the object from the associated holes, with the aid of such a flexible mechanism, it is most important to detect whether the objects are being continuously inserted with the pressure applied to the objects in the direction of insertion ($z$ direction) kept within a predetermined value, or the inserting operation is stopped with the pressure rapidly increasing beyond that level. For this purpose, it is only necessary to detect whether the elastic displacement or deformation of the flexible mechanism in the $z$-direction exceeds a certain constant value or not. A sensor 11 is provided to detect the deformation or displacement of the flexible mechanism in the $z$-direction, as shown in FIG. 2a or 2b. A plurality of such sensors may be provided if necessary and each of the sensors may have a linear input-output characteristic as shown in FIG. 3a, an on-off characteristic as shown in FIG. 3b, or an output characteristic in which an output is delivered only when a desired displacement is caused, as shown in FIG. 3c. Here, for the completion of the description of the constitutions in FIGS. 1, 2a and 2b, the following have to be added: reference numeral 1 indicates an object to be inserted into a hole, 2 a substrate in which a hole 3 is made, 4 a holding mechanism, 5 a positioning mechanism, 6 a flexible mechanism as a whole, 7 a bearing, 8 a member movable in the $x$- and $y$-directions, 9a and 9b members movable in the $z$-direction, 10 a base member, 12a and 12b spring means, and 13 a movable member.

The sensor 11 to detect the inserting pressure may be provided in the center of the base member 10 as shown in FIG. 2a or 2b, or a plurality of such sensors may be provided in an appropriate manner, depending upon the structure of a flexible mechanism to be employed.

The setting of the inserting force in the inserting operation below a certain level has such a significance as described below. In FIG. 1, there is between the inserting force $F_z$ and the force $F_s$ exerted on the point of contact of the shaft with the hole, a relationship such that $$F_s \doteq \frac{F_z}{2 \mu D} \qquad (4)$$

It is preferable to reduce the inserting force $F_z$ as small as possible, in order to perform the inserting operation without damaging minute or fine parts. Moreover, if the shaft is restricted in the relative movement in the $x$- or $y$-direction, the increase in $F_z$ accompanies a rapid increase in $F_x$ so that if the force in the $x$-direction exceeds a certain value, the shaft is fixedly engaged with the hole. Hence, it is essential to keep the inserting pressure, i.e., the relative displacement of the flexible mechanism in the $z$-direction, within a certain constant value corresponding to the characteristic of the mechanism. The concrete description of the inserting operation by such a flexible mechanism as described above with the inserting force $F_z$ kept below the predetermined level, will be given in the following.

Figure 4:
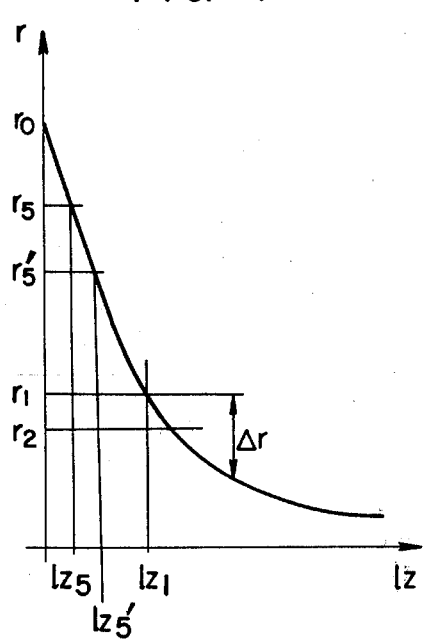
FIGS. 4, 5 and 6 are diagrams useful for explaining the principle of the present invention.

If $d_1$, $d_2$ and $l_o$ is given in the formulae (1) and (2), the relationship between $l_z$ and $r$ is expressed as a curve as shown in FIG. 4. Namely, the allowable angle $\alpha$ of the inclination of the shaft is comparatively large when the depth $l_z$ to which the shaft is inserted is small, so that the point $P_o$ can displace to an appreciable extent in the $x$- and $y$-direction. As the depth $l_z$ increases, the allowable displacement decreases rapidly. As shown in the $x$-$y$ plane in FIG. 5, the maximum allowable displacement for $l_z = 0$ is represented as dots on the circle of radius $r_o$. For example, in the case of precise insertion with $d_1 = 2.02$ mm and $d_2 = 2.00$ mm, if $l_o = 100$ mm, $r_o$ is about 4 mm. The value of 4 mm is a comparatively large one. Accordingly, the intitial position of the point $P_o$ can be easily set within the circle of radius $r_o$ by the use of an ordinary conveying and supplying means. Let it be assumed that the initial position of the point $P_o$ is at $P_1$ in FIG. 5. Then, since $P_1$ is at a distance $r_1$ from the center of the hole, the shaft can be inserted without any restriction to the depth $l_{z1}$, as apparent from FIG. 4. In order for the shaft to be inserted to a greater depth, it is necessary for the flexible mechanism to displace a distance $\Delta r$ in the $x$- or $y$-direction as shown in FIG. 4. The distance increases with the increase in $l_z$. In this case, the counter force corresponding to the elastic coefficient of the flexible mechanism is generated. The counter force is $F_x$ in FIG. 1 and represented by a curve labeled $F_{x1}$ in FIG. 6.

Figure 6:
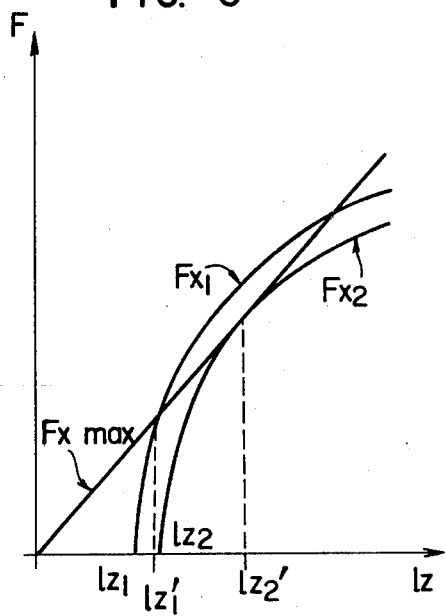
Figure 5:
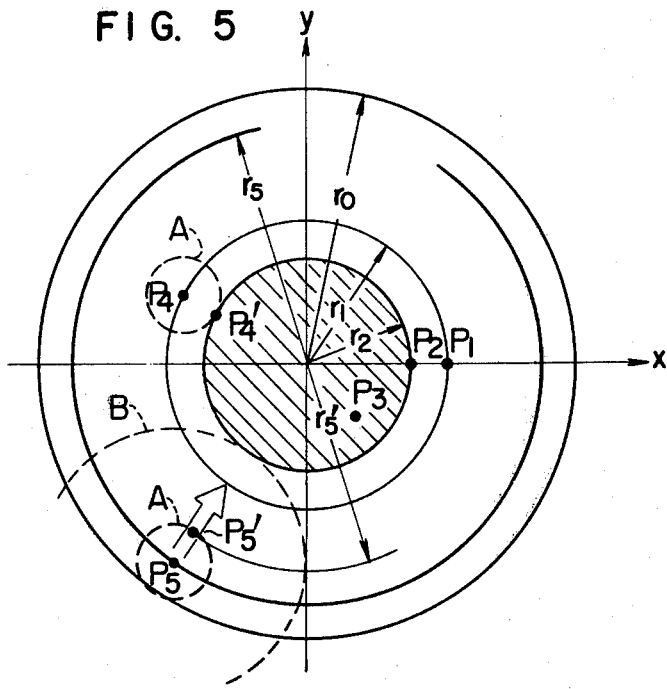

The formula (3) gives the ratio of $F_x$ to $F_z$ and the allowable value $F_{xmax}$ of $F_x$ for a fixed value of $F_z$ approximately varies in a linear fashion with respect to $l_z$, as shown in FIG. 6. Therefore, the maximum depth to which the shaft is inserted when the point $P_o$ is at $P_1$, is $l'_{z1}$. On the other hand, when the point $P_o$ is at $P_2$ in FIG. 5, the counter force varies as represented by a curve labeled $F_{x2}$ in FIG. 6 and it is seen that $F_{x2}$ never exceeds $F_{xmax}$. Namely, the shaded area in FIG. 5 is a region for which the shaft can be inserted into the hole to an arbitrary depth without moving the positioning mechanism in the $x$- or $y$-direction.

As apparent from the foregoing description, through the use of the flexible mechanism having one of the characteristics described above with reference to FIGS. 3a to 3c, it is made possible to insert the object into the hole even if the object is not exactly positioned with respect to the hole by the positioning mechanism to control the positioning of the object, that is, there is an initial deviation in the position of the object. This is one of the remarkable features of the present invention. As described above, it is rather easy to design a flexible mechanism wherein the region (direct insertion area) for which the object can be directly inserted into the hole has a radius of about 0.5 mm to 1.00 mm in the case of the above described precise insertion where $d_1 = 2.02$ mm and $d_2 = 2.00$ mm.

If the object is initially outside the direct insertion area, e.g. $P_o$ is at $P_1$, the object is inserted at most only to the depth $l_{z1}$ as described above. In this case, a further displacement of the positioning mechanism in the $-z$ direction causes the inserting force to exceed the predetermined constant value so that the deformation of the flexible mechanism in the direction of insertion increases. The deformation is detected by a sensor to stop the insertion of the object in the $z$-direction and then the positioning mechanism is shifted in position in a searching manner. Accordingly, the point $P_o$ reaches, for example, $P_2$ in FIG. 5 which is nearer to the direct insertion area than $P_1$ so that the condition that the object (shaft) can be inserted again, is resumed and the deformation of the flexible mechanism becomes smaller than a predetermined value. Upon detection of the deformation less than the predetermined value by the sensor, the searching operation is stopped and the inserting operation is resumed.

According to the insertion control using such a searching operation as described above, the shaft can be inserted into the proper hole even if the point $P_o$ is initially at, for example, $P_4$.

In the insertion control in which the searching and inserting operations are alternately performed, the greater is the direct insertion area, the easier is the searching operation. Namely, if the area is large enough, rather a rough searching motion can still converge to the center of the hole.

On the other hand, when the point $P_o$ of the shaft is at $P_5$ in FIG. 5 which is remote from the direct insertion area, it seems that a searching motion covering such a very large area as enclosed in a broken circle B is needed. Also in this case, however, it is only necessary to make a searching motion within a smaller area A, just as in the case where the searching motion is started at $P_4$. By doing this, as apparent from FIG. 4, the depth of insertion for $P'_5$ can change by an amount of $l'_{z5} - l_{z5}$ and the change can be detected by detecting the variation in the counter force in the direction of insertion. Through the discovery of the point $P'_5$, it is possible to approximately find the direction in which the direct insertion area lies, as indicated by a thick arrow in FIG. 5. Then, a searching motion having a definite orientation can be performed to avoid any searching superfluous and redundant in time and distance.

The insertion control system according to the present invention has hitherto been described and the summary z-direction may be stated as follows.

1. The subject to be inserted is supported by a flexible mechanism substantially capable of elastic deformation.

2. A sensor which can detect the relative deformation of the flexible mechanism in the z-direction is incorporated.

3. A searching motion within a certain area is performed with the aid of the sensor so that the position and the direction for deeper insertion may be found.

With this system, it is only necessary to use a single sensor, and therefore the structure can be simplified and the searching motion will not have any superfluous distance and time except in the initial searching within a certain constant area. The more remarkable feature of this system is that since the inserting operation is performed by detecting the variation in the inserting force depending on the relative positions of the shaft and the hole, the system can be used also in the case where the axial lines of holes are inclined with respect to the vertical line and in the case where the precisions of the peripheral equipments cannot be improved.

The present invention will be described in the following by way of preferred embodiments.

Figure 7:
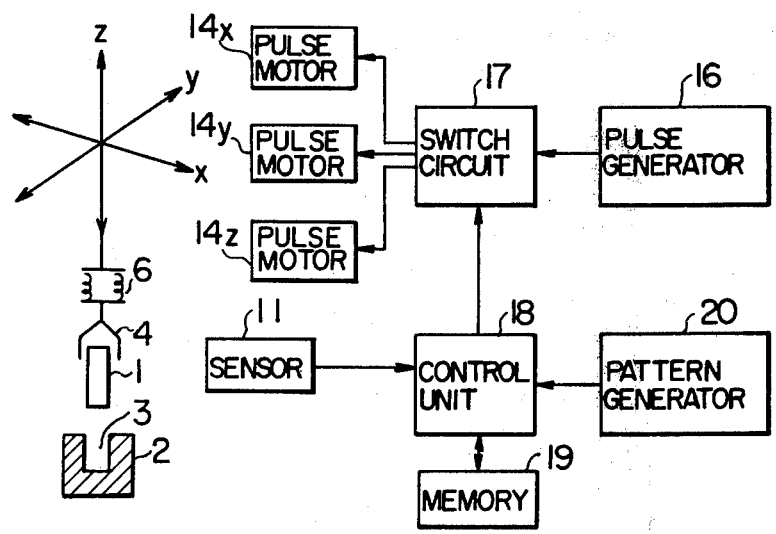
FIGS. 7, 8a and 8b show an embodiment of the present invention and illustrate the operation of the embodiment.
Figure 8A:
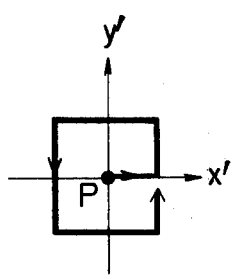

FIG. 7 shows an embodiment of the present invention, in which a three-dimensional positioning mechanism is driven by pulse motors $14x$, $14y$ and $14z$. A pulse generator 16 delivers an output which is used through a switching circuit 17 to drive the motors. A control unit 18 sends to the switching circuit 17 an instruction necessary in response to the variation in the output of the sensor 11. The control unit 18 is combined with a memory 19 which memorizes the priority of the order of the searching motion in the x- or y-direction and a pattern generator 20 which generates predetermined searching patterns. FIG. 8a shows an example of the searching pattern according to which searching is performed around the initial position P. After the positioning of the shaft 1 with respect to the hole 3 through some measure, the control operation of the device shown in FIG. 7 is performed as follows.

Figure 8B:
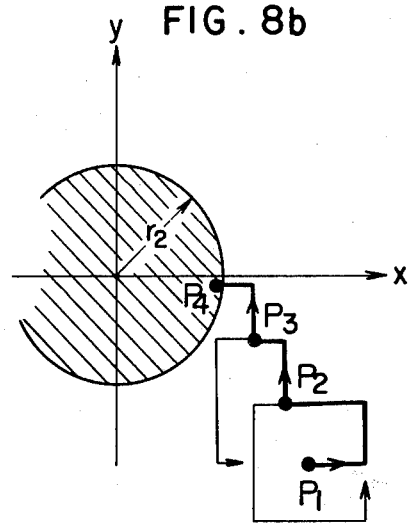

Let it be assumed that the initial position of the point $P_o$ is at $P_1$ in FIG. 8b and that the incapability of the insertion of the shaft in the z-direction is detected by the sensor 11. Then, the control unit 18 selectively drives the pulse motors 14x, 14y and 14z to cause the positioning mechanism to perform the searching motion according to the search pattern as shown in FIG. 8a, set in the pattern generator 20. When the capability of insertion is again detected after the shift from $P_1$ to $P_2$, the pulse motor 14z to cause the displacement of the positioning mechanism in the z-direction is driven again to resume inserting operation until the shaft is restricted, after the +y and the -x directions which are the components of the orientation from $P_1$ to $P_2$ have been memorized as preferential directions in the memory 19. If the restriction in the z-direction is detected by the sensor 11, the motor 14z governing the motion of the positioning mechanism in the direction of insertion is stopped and the searching operation is initiated. In this case, the search pattern as shown in FIG. 8a is followed according to the memorized preferential directions. Hence, the search motion follows $P_3$ and $P_4$ and finally the inserting operation is completed. As seen from FIG. 8b, the desired position can be reached without any superfluous motion except in the initial stage.

The foregoing is the description given to the case where a cylindrical shaft is inserted into a cylindrical bore. It should be noted here that the present invention can be applied also to the case where the object and the hole have not a cylindrical form or where the direction of insertion is other than vertical. Further, it is needless to say that the motion of the positioning mechanism is not limited to those along the axes of the rectangular coordinate system and that the structure of the sensor used is not limited to a specific one.

As described above, the control of the position of the object to be inserted, according to the system mentioned above, is performed in a searching fashion and depends on the precise detection of the deformation of the flexible mechanism in the direction of insertion. Accordingly, if it is desired to change the inserting force in accordance with the variation in the weight of the object (shaft) or in the clearance between the object and the inner wall of the hole, either the spring means must be replaced by another having a different spring constant or the location of the sensor must be changed.

Figure 9:
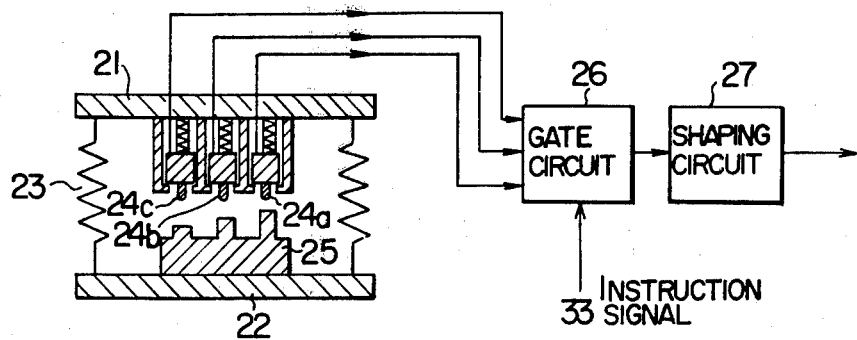
FIGS. 9 and 11 schematically show the principal portions of control systems as other embodiments of the present invention.

FIG. 9 shows the principal portion of a control system which is an improved version of the system shown in FIG. 7 and can cope with the change in the working condition described above. As seen in FIG. 9, a plurality of contactors are provided to detect the relative displacements of a base member 21 and a movable member 22. On the other hand, a displacement detector 25 attached onto the movable member 22 is provided with protuberances having different heights. Accordingly, as the relative displacement increases, the detectors 24a, 24b and 24c are turned on in this order mentioned. Each of the detectors is protected by a spring from damage when it is further pushed in beyond the level where it is turned on and off. The outputs of the detectors are selectively passed through a gate circuit 26 and the selected one is sent via a shaping circuit 27 to a positioning control circuit. If it is desired to change the inserting force, it is only necessary to select a desired one of the outputs of the detectors by the instruction signal 33. For example, if the detector 24a is selected, the output of the shaping circuit 27 is turned on for the smallest displacement so that the value of the inserting force for which the search motion is initiated is the smallest while if the detector 24c is selected, the inserting force is the largest so that forcible insertion will be possible. Moreover, the case where the weight of the object is changed, can be explained in a similar manner. Namely, a heavier object and a lighter one cause different relative displacements between the members 21 and 22 when there is no external force applied, so that the same inserting force can be attained independent of the weight of the objects if the detectors 24a and 24c are selected respectively for the heavier and the lighter objects.

Figure 10:
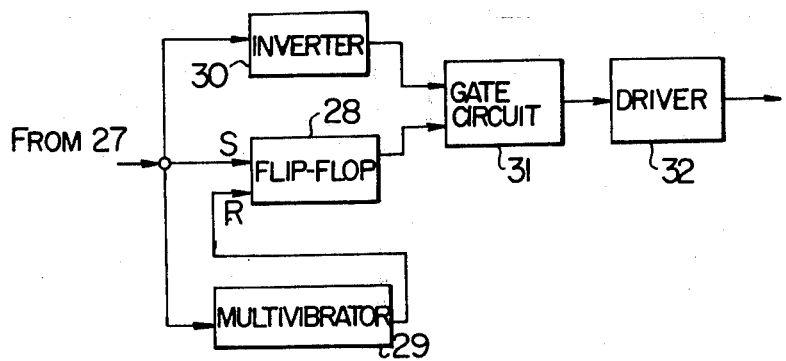
FIGS. 10 and 12 are block diagrams of circuits, each having only one sensor, which perform control operation equivalent to those of the embodiment in FIGS. 9 and 11.

One of the problems which must be solved in the on-off control of the detectors by means of the contactors, is as follows. When the displacement in the direction of insertion is stopped with the contactor turned on and the searching motion is initiated, it may occasionally happen that the contactor is turned off due to a slight deformation of the flexible mechanism. Consequently, the precise searching becomes impossible. In order to solve this problem, two detectors which are operated for different displacements can be used to utilize a hysteretic characteristic, but if the system as shown in FIG. 10 is employed, only one detector is needed. In FIG. 10, reference numerals 28 is a flip-flop circuit which is set by the output of the shaping circuit 27 in FIG. 9, 30 an inverter, 31 an OR gate, and 32 a drive circuit for the motor to cause the displacement in the z-direction. Accordingly, the motor is energized during the period in which the output of the detector and therefore that of the shaping circuit 27 is off or during the period in which the output is off but the flip-flop 28 is set. A monostable multivibrator 29 is triggered when the output is turned on, so that the flip-flop 28 is reset after a certain period of time to stop the motor. In this way, the system in which only one detector is used and which causes a constant displacement after the detector has been turned on, can perform the same control operation as the system using two detectors. It is noted here that if a step motor is used as the drive motor, the monostable multivibrator 29 is to be replaced by a counter to count a predetermined number of drive pulses.

Figure 11:
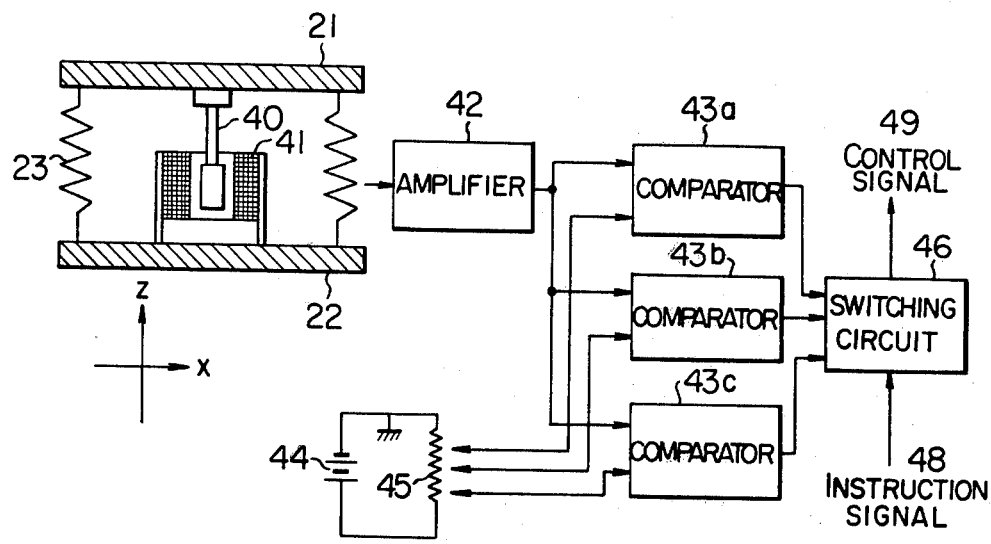

FIG. 11 shows another embodiment of the present invention, in which a differential transformer consisting of an iron core 40 and a winding 41 is provided to detect the relative displacement of the base member 21 and the movable member 23 in the direction of insertion. In this case, the differential transformer can be replaced by any detector which can continuously detect the relative displacements. FIG. 13 shows the output characteristic of the displacement detector.

In FIG. 11, an amplifier 42 amplifies the output of the differential transformer and the output of the amplifier 42 is applied to comparators 43a, 43b and 43c. A threshold setting circuit consisting of a constant voltage source 44 and a variable resistor 45 delivers output voltages having different amplitudes, which are applied as compared voltages to the comparators. The outputs of the comparators are changed in on-off fashion respectively for the relative displacements $\Delta_{za}$, $\Delta_{zb}$ and $\Delta_{zc}$ in the z-direction (direction of insertion), as shown in FIGS. 13 and 14 in $E_a$, $E_b$ and $E_c$ are the threshold voltages delivered from the threshold setting circuit and $E_s$ is the output of the differential transformer. The outputs of the comparators are selected by a switching circuit 46 in accordance with an instruction signal 48 and the selected one of the outputs is sent as a control signal 49 to the positioning circuit. FIG. 15 shows the selected signal. When the control signal 49 is generated, the inserting operation, for example, is stopped.

If it is desired to change the inserting force in the inserting operation, it is only necessary to select the desired one of the comparator outputs by the instruction signal 48.

For example, if the characteristics shown in FIG. 14a is selected, the output is turned on for a smaller displacement so that the value of the inserting force for which the search motion is initiated is smaller while if the characteristic shown in FIG. 14c is selected, the inserting force is large so that the forcible insertion will be possible.

The same control can be applied also to the case where the weight of the object to be inserted is changed. Namely, a heavier object and a lighter one cause different relative displacements between the base member 21 and the movable member 22 when there is no external force applied, so that the same inserting force can be applied to both the objects if, for example, the characteristics shown in FIGS. 14a and 14c are selected respectively for the heavier and lighter objects.

Figure 12:
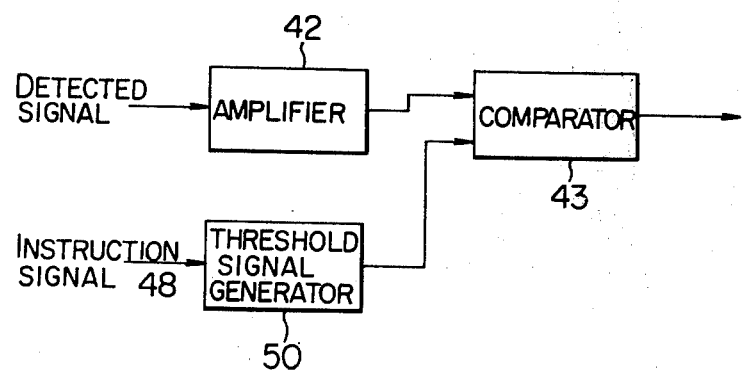

The signal processing by the circuit shown in FIG. 11 can also be performed by the embodiment shown in FIG. 12. In that case, a single comparator 43 is used and the output of a threshold signal generator 50 is controlled by the instruction signal 48. Namely, as shown in FIG. 15, the state represented by solid line is changed to that represented by dotted line, according to the instruction signal 48. According to this method, the continuous or multi-stage change in the output state can be easily made by appropriately designing the threshold signal generator 50. Moreover, a constant inserting force can be developed independent of the weight of the object to be inserted if a signal proportional to the weight of the object is used as the instruction signal 48. Further, a signal depending upon the material and the weight of the object can also be used.

Figure 16:
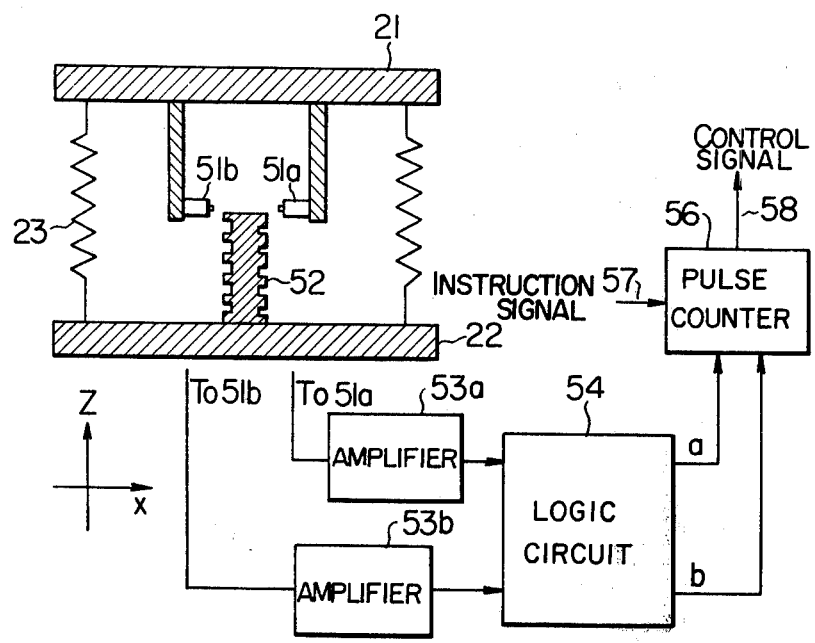
FIG. 16 schematically shows the principal portion of a control system as another embodiment of the present invention.
Figure 17A:
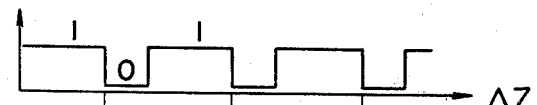
FIGS. 17a, 17b and 17c are diagrams useful for explaining the operation of the control system shown in FIG. 16.
Figure 17B:
Figure 17C:
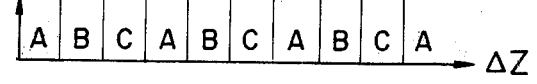

FIG. 16 shows another embodiment of the present invention, in which reference numerals 51a and 51b indicate detectors having on-off output characteristics, e.g., proximity switches, and numerals 53a and 53b designate circuits for amplifying and shaping the outputs of the proximity switches. Since the proximity detecting end 52 has such an asymmetric shape as shown in FIG. 16, the outputs of the amplifiers 53a and 53b with respect to the variation $\Delta_z$ in the relative positions of the members 21 and 22 are as shown in FIGS. 17a and 17b, respectively, if the detectors 51a and 51b have the same characteristic. Provided that when both the outputs of the amplifier 53a and 53b have the level 1, it is defined as state A, that when the output of the amplifier 53a is 1 while the output of the amplifier 53b is 0, it is defined as state B, and that both the outputs of the amplifiers 53a and 53b are 0, it is defined as state C, then FIG. 17c results from FIGS. 17a and 17b. Accordingly, if the way the states A, B and C take place is known, the amount of deformation of the flexible mechanism, i.e. the direction and the amount of the variations in the relative positions of the members 21 and 22, can be known. A logic circuit 54 in FIG. 16 serves to detect such an amount of deformation and the outputs $a$ and $b$ give the direction and the amount of the variation, respectively.

The distance between the object 1 and the hole 3 varies from object to object, if the objects have different weights, in the balanced condition that the object is not in contact with the substrate in which the hole is made. Now, provided that the inserting operation is started and the positioning mechanism is displaced from the point of equilibrium in the $-z$ direction to increase $\Delta Z$. Then, by stopping the shift in the $-z$ direction and starting the search motion when the increment becomes equal to a predetermined value, the search motion can be performed with a constant inserting force independent of the weight of the object if the spring constant of the spring means 23 is constant. Namely, the outputs of the logic circuit 54 are processed by a pulse counter 56 and when the constant variation of $\Delta Z$ determined by the instruction signal 57 is detected, the control signal 58 is delivered to initiate the search motion. The search motion will cause correction positioning toward the center of the hole. As the object is inserted into the hole, $\Delta Z$ decreases. This decrease has an influence upon the output $a$ of the logic circuit 54 so that the output 58 is changed to stop the search motion. It is apparent from the above description that the inserting force can be arbitrarily controlled in this case by changing the instruction signal 57.

Figure 18:
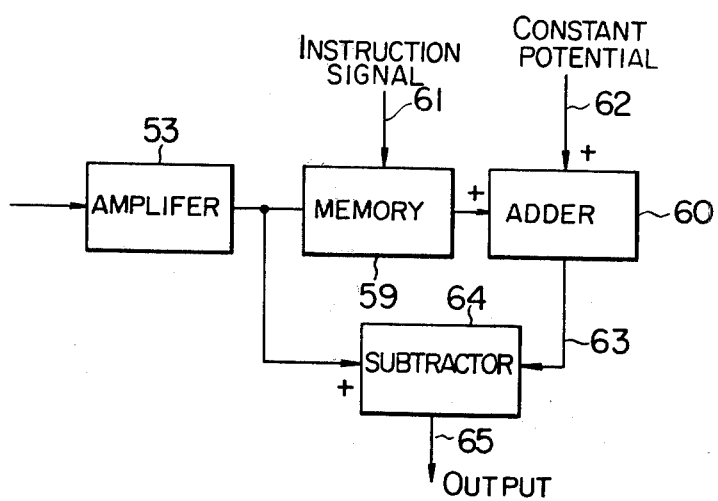
FIG. 18 is a block diagram of a control circuit having the same function as the control system in FIG. 16.
Figure 19:
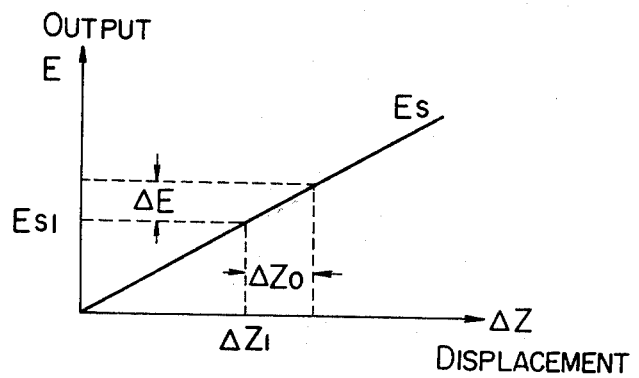
FIG. 19 is a diagram useful for explaining the operation of the control circuit shown in FIG. 18.

FIG. 18 shows a similar control system in which a detector to continuously deliver an output representing the amount of deformation of the flexible mechanism is used. A differential amplifier can be used as such a detector. The continous output is first amplified by an amplifier 53 and the output $E_s$ of the amplifier 53 varies linearly with $\Delta Z$, as shown in FIG. 19. Now, let it be assumed that the amount of the deformation of the flexible mechanism is $\Delta Z1$ under the equilibrium in which the object is floating above the substrate and that the output of the amplifier is at the level of $E_{s1}$. The level $E_{s1}$ is stored in, for example, an analog memory 59 employing a capacitor according to the external instruction signal 61. An adder 60 serves to deliver an output which is the output of the memory 59 plus a constant voltage 62 supplied externally. A subtractor 64 delivers an output which is the difference between the output of the amplifier 53 and that of the adder 60. The output 63 of the adder 60 is a reference value. Namely, as apparent from FIG. 19, if the constant voltage is $\Delta E$, the output 65 of the subtractor 64 becomes positive when the flexible mechanism further displaces by $\Delta Zo$ from the equilibrium state. It is therefore seen that the constant voltage signal 62 and the output 65 of the subtractor 65 in FIG. 18 correspond to the instruction signal 57 and the control signal 58 in FIG. 16. In this system shown in FIG. 18, the inserting force can be varied by changing the level of the input voltage 62.

As described above, according to the present invention, there can be provided an automatic inserting apparatus which can cope with various objects having different weights and which can change the inserting force.

Now, the flexible mechanism used in the present invention will be described in particular. The flexible mechanism which elastically couples the positioning mechanism to the object holding mechanism, must have such functions as follows.

1. The capability of elastic deformation in the direction of insertion upon reception of external force, to prevent the object from being strongly urged against the wall or the brim of the hole.
2. The capability of elastic deformation perpendicular to the direction of insertion, to make possible the insertion of the object into the hole by a positioning mechanism having poor accuracy.
3. The cability of slanting with respect to the axis of insertion, to compensate for the deviation of the axial direction of the object from that of the hole.
4. The capability of exactly detecting the amounts and the directions of the above deformations if need be.

Figure 20:
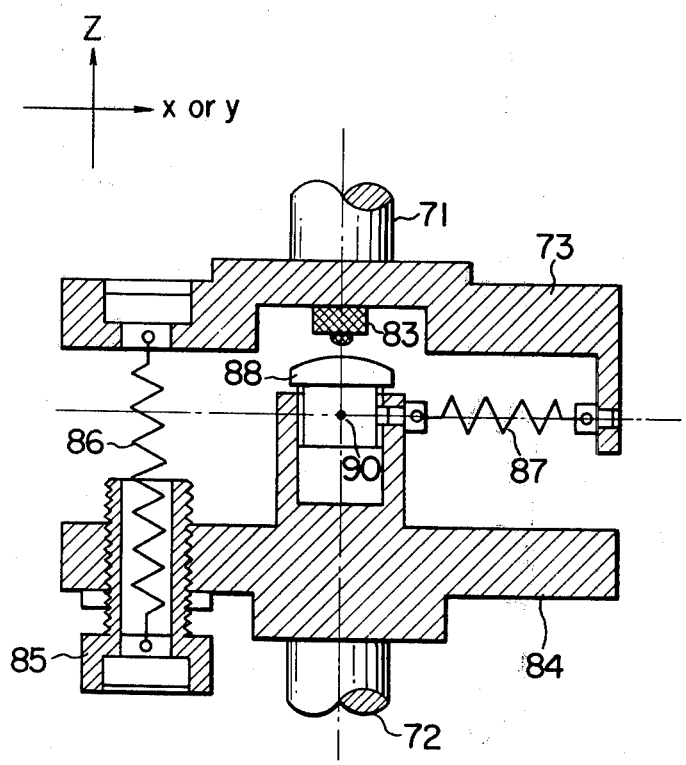
FIGS. 20, 21a to 21f, 22, 23, 24 and 25 show in cross section that other embodiments of a flexible mechanism used in the system according to the present invention.

FIG. 20 shows an example of such a flexible mechanism as satisfies the above requirements. In FIG. 20, the portions on the left and right sides of the vertical center line are respectively cross sections taken at angular positions separated by 45° about the Z axis from each other. In this embodiment, the flexible mechanism does not allow three independent displacements as in the embodiment shown in FIG. 2a. A movable member 84 is coupled by means of a spring 86 elastic in the direction of insertion and a spring 87 elastic perpendicularly to the direction of insertion, to a base member 73 fixed to the positioning mechanism, and the object holding mechanism is fixed to the movable member 84. In this flexible mechanism, four springs 86 and four springs 87 are provided, separated by an angular distance of 45° from one another about the Z axis. The operation of the flexible mechanism will be described below with the aid of FIGS. 21a to 21f. If external force in the z-direction is applied to the flexible mechanism in the equilibrium shown in FIG. 21a, there will be caused a displacement in the z-direction mainly according to the characteristics of the spring 86, as shown in FIG. 21b. On the other hand, external force perpendicular to the z-direction will cause a displacement in the x- or y-direction mainly according to the characteristics of the springs 87, as shown in FIG. 21c. Moreover, if angular moment due to external force is applied to the movable member, an inclination mainly according to the characteristics of the springs 86 takes place, as shown in FIG. 21d. The inclination has the supporting point (fulcrum) 90 determined by the disposition of the springs 87 as its center. As described above, the structure shown in FIG. 20 does not need an independent mechanism including a guide member and is simple, inexpensive and of great utility.

Figure 21:
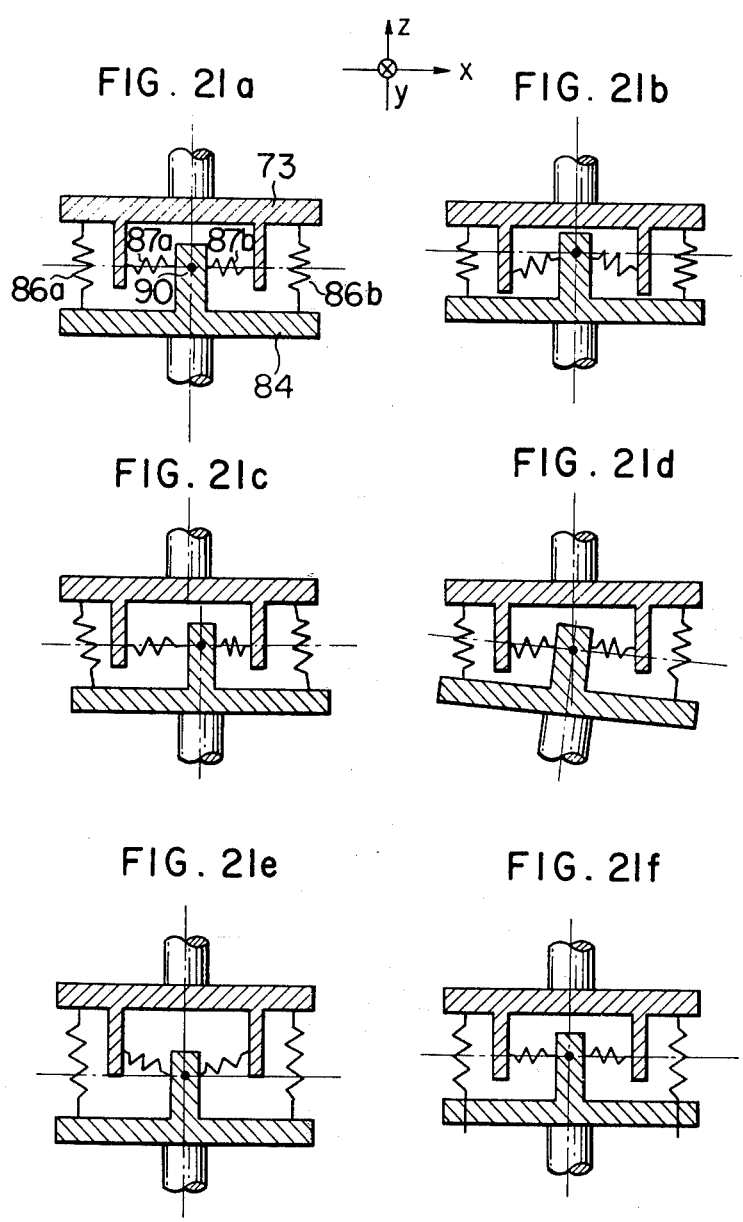

The spring mechanism 85 in FIG. 20 is used not only to control the urging force of the spring but also to cope with an object having a different weight. For example, the mechanism 85 can be used in the case where the same situation as that shown in FIG. 21a is attained by changing the situation shown in FIG. 21e to that shown in FIG. 21f, that is, the distance between the base member 73 and the movable member 74 shown in FIG. 21 or 20 must be adjusted for the detecting condition of the detector to detect the displacement in the z-direction, or in the case where the horizontal balance of the movable member 84 must be appropriately adjusted since the horizontal balance of the positioning mechanism is incomplete or the object to be inserted is not balanced in weight. The threaded structure of the displacement detecting end 88 permits the arbitrary setting of the detecting condition of the fixed detector 83 and the rounded surface of the end 88 can make it possible to detect with appreciable precision the displacement in the z-direction even if the movable member is inclined to some extent.

It should be noted here that the relative displacement or the relative inclination of the flexible mechanism have only to be within a predetermined limit corresponding to the deviations of the supplied objects from the associated holes.

Accordingly, by preventing the relative displacement or inclination of the flexible mechanism beyond the predetermined limit with a mechanical stopper appropriately located, the undesirable oscillation due to flexibility or the damage due to excessive external force can be prevented.

Figure 22:
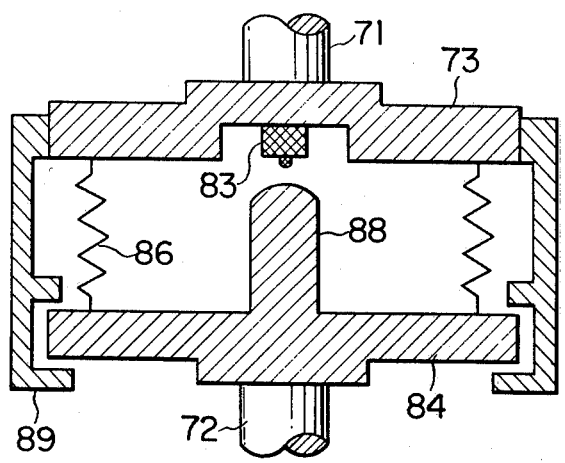

FIG. 22 shows an example of such a mechanism as described just above, in which the movable member 84 is prevented from relatively displacing farther than a predetermined value by means of a stopper 89.

Moreover, according to the flexible mechanism embodying the spirit of the present invention, the insertion of minute objects is possible without detecting the relative positions of the objects by a detector if the deviations of the objects from the holes and this leads to the simplification of mechanism.

Figure 23:
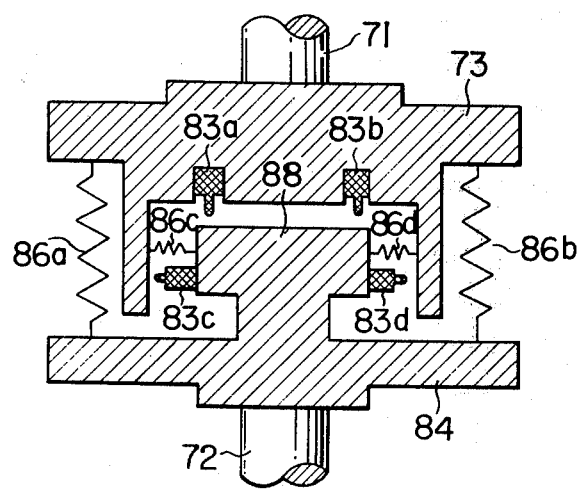

In the embodiments shown in FIGS. 20 and 22, the detector is provided to detect the relative displacement of the flexible mechanism in the direction of insertion, but another embodiment which can also detect the relative inclination of the flexible mechanism is shown in FIG. 23. In FIG. 23, detectors 83a and 83b are provided to detect both relative displacement and inclination. The relative displacement is detected when both of them are operated while the relative inclination is detected when one of them is actuated.

Moreover, if additional detectors are provided at the positions indicated at 83c and 83d, the relative displacement of the flexible mechanism in the direction perpendicular to that of insertion can be detected so that the direction of deviation of the object from the hole can be also known.

With these additional detectors, the situation of the inserting process becomes clearer than with only detectors for relative displacement so that the inserting operation can be controlled with further precision.

Figure 24:
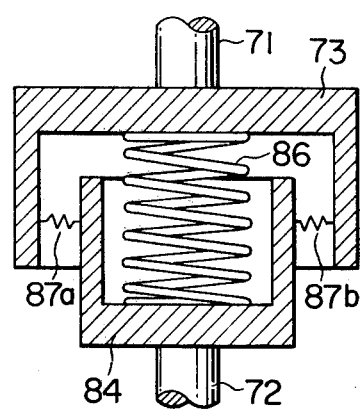
Figure 25:
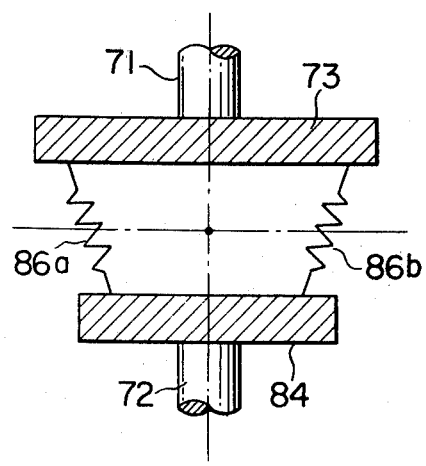

In the embodiment shown in FIG. 20, there are provided four springs for the displacement in the direction of insertion and four springs for the displacement in the direction perpendicular to that of insertion, but only three may be provided for each direction for the purpose of simplification. Moreover, such a structure as shown in FIG. 24 in which one spring is provided for the direction of insertion and three or four for the perpendicular direction, can be practised. Further, as shown in FIG. 25, a plurality of aslant disposed springs may respond to the displacements in both the direction of insertion and the perpendicular direction.

As described above, according to the present invention, the precise inserting operation for the assembly of minute and intricate parts can be performed by the use of a flexible mechanism having a simple structure consisting of a plurality of springs.

Next, the search patterns used in the insertion control system or automatic assembly control system according to the present invention will be described in detail.

In the case where the primary operation of an apparatus for seizing a shaft and carrying it to a hole cannot properly position the shaft with respect to the hole instead of beveling of the shaft and/or the hole since the precision of the apparatus or the position of the hole is poor, the inserting operation will sometimes make no progress if the used search pattern has a fixed size. If, in order to avoid this kind of inconvenience, the position where the primary operation of the positioning mechanism is initiated is successively shifted from place to place, the region will be reached sometime in the future where the inserting operation proceeds. However, unless the shifting of the position is proper, the positioning operation will be of poor efficiency in view of search time, as is often the case. For example, a method is proposed in which the maximum distance between the shaft and the hole is previously detected and the search motion performed within an area having the distance as its radius. This method has rather a poor efficiency because one shaft is nearer to its proper hole than another is to the associated hole so that the searching for the nearer hole will be redundant.

Figure 26A:
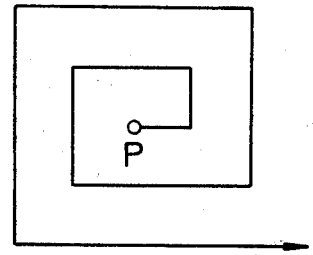
FIGS. 26a, 26b and 26c show search patterns used in the system according to the present invention.
Figure 26B:
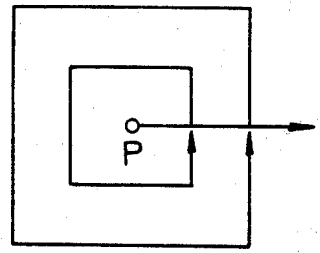
Figure 26C:
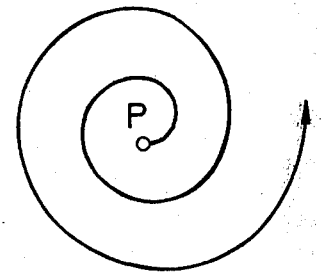

Therefore, an ideal method is to first search the proper position and thereafter to extend the searching motion over wider area until the hole is reached. Accordingly, the pattern for the primary searching is not fixed but spirally widening, as shown in FIGS. 26a to 26c. With these pattern used, the searching operation can be performed with high efficiency even if there is initially rather a large distance between the shaft and the hole. After completion of positioning, the widening pattern need not be used and a fixed pattern can be used.

Now, a concrete embodiment of the present invention will be described.

Figure 27:
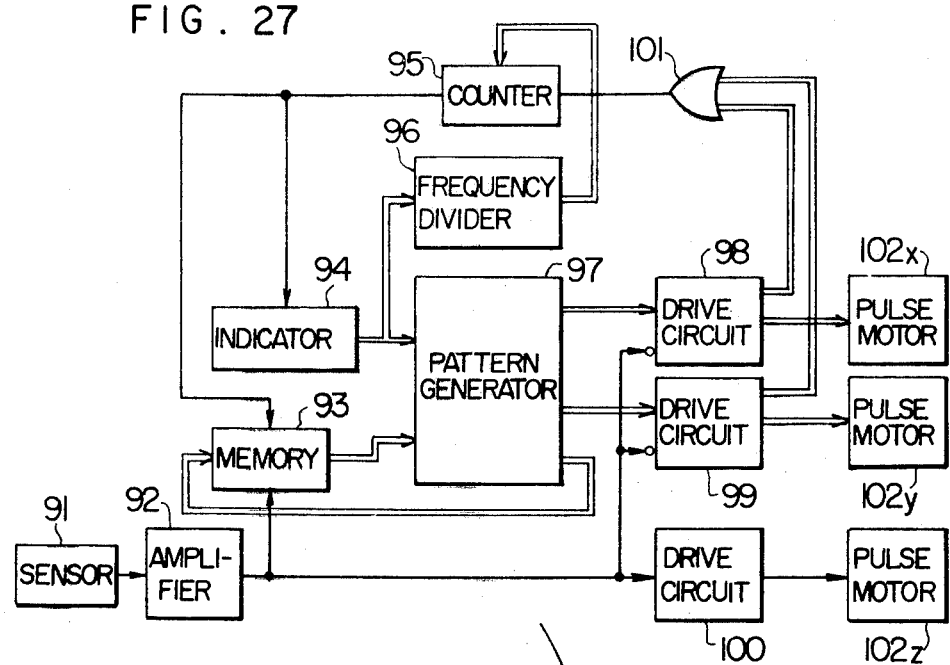
FIG. 27 is a block diagram of an embodiment of a control circuit used in the system according to the present invention.

FIG. 27 shows a control circuit as one embodiment of the present invention. The above described positioning mechanism is driven by pulse motors 102x, 102y and 102z. Drive circuits 98, 99 and 100 are controlled by search pattern generator 97. The signal detected by a sensor 91 is amplified by an amplifier 92 and then applied to the drive circuits 98, 99 and 100 to control the pulse motors 102x, 102y and 102z. A memory 93 serves to memorize the preferential order of the search motions in the x- and y-directions and selects the patterns generated by the search pattern generator 97. A frequency divider 96 and a counter 95 for counting the distance followed by the search motion constitute a section for controlling widening process. An OR circuit and a step indicator are designated respectively at reference numerals 101 and 94. The search pattern shown in FIG. 26b is employed as a test pattern.

Figure 28:
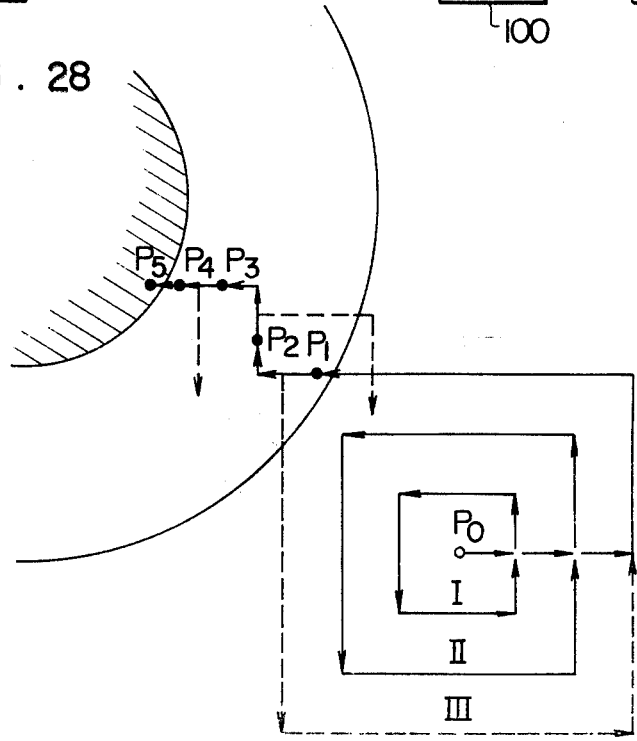
FIG. 28 is a diagram useful for explaining the operation of the circuit shown in FIG. 27.

It is assumed that the object to be inserted into its proper hole is initially located at the point $P_o$ in FIG. 28. Since the point $P_o$ is outside the direct insertion area, the inserting operation does not take place but the positioning operation must be performed. Accordingly, the positioning mechanism is subjected to search motion in accordance with the search pattern having its center at the point $P_o$, generated by the search pattern generator 97. When the step indicator 94 recognizes that the positioning is not finished even after the pattern I has been completely covered, the frequency divider 96 determines the frequency dividing rate of the counter 95 so that another pattern II having a larger size may be generated. The pattern II is again followed by the positioning mechanism. If the positioning is not proper even after the searching motion along the pattern II, a new frequency dividing ratio is determined so that a still large pattern III is followed by the positioning mechanism. In this way, search patterns increasing in size are successively generated. When the release of the restriction in the z-direction, that is, the completion of the positioning, is detected at $P_1$ during the search motion along the pattern III, then the frequency divider 96 is reset to reduce the pattern to be followed next to the initial size. The searching motion to reach the direct insertion area, starting from the point $P_1$, are as follows. A suitable pattern is generated by the memory 93 and the search pattern generator 97, in the direction in which the inserting motion progresses. For example, the path $P_1 - P_2 - P_3 - P_4 - P_5$, as shown in FIG. 28, is followed to complete the inserting operation. Thus, even if the initial distance between the object and the hole is rather large, the searching operation can be effectively performed, as is apparent from the result of searching in FIG. 28.

On the other hand, as apparent from FIG. 4, as the insertion progresses, the distance the object can move in the x- or y-direction is decreased. Accordingly, if a search pattern having a fixed size is used, the operation creates redundancy as the insertion progresses. In order to perform an efficient search motion, therefore, the size of the pattern should be reduced as the inserting process advances. The search pattern without redundancy can improve the function of insertion. Namely, since the depth of insertion is determined not only by such geometrical factors as the clearance between the object (shaft) and the hole and the inclination of the axis of the object, but also by the inserting force and the force applied to the object in the x- or y-direction, then the smaller is the force in the x- or y-direction, the more effective is the inserting process.

Therefore, if the search motion is continued along a pattern having a fixed size even after the depth is increased and the allowable displacement in the x- or y-direction is decreased, then the deviation of the positioning mechanism from the axial line of the hole increases to increase the force applied to the object in the x- or y-direction.

Figure 29:
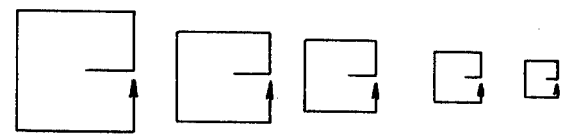
FIG. 29 is a diagram useful for explaining the searching operation of the circuit shown in FIG. 30.
Figure 30:
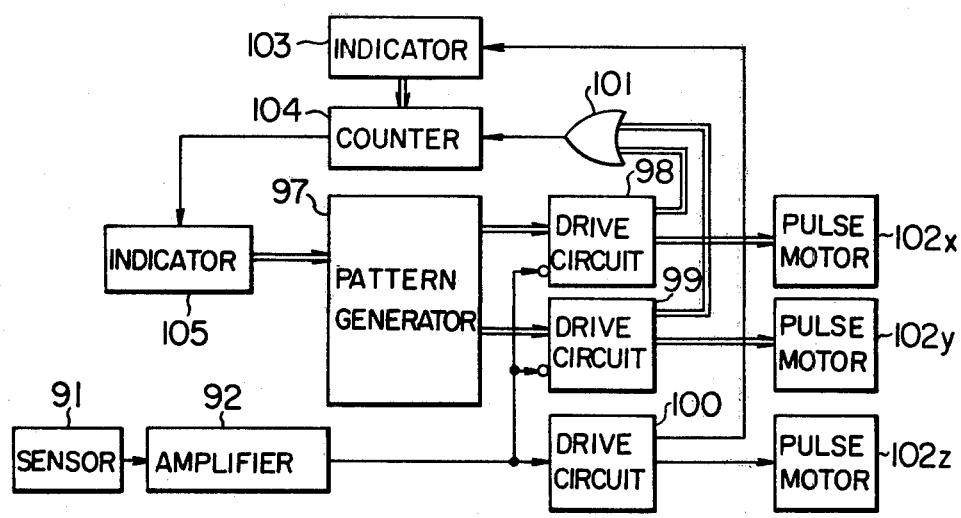
FIG. 30 is a block diagram of another embodiment of a control circuit used in the system according to the present invention.

FIG. 30 shows a circuit which can perform such a control as described just above. In the search pattern generator 97, a pattern such as that shown as having the largest size in FIG. 29 is written, the pattern consisting of nine steps. The number of the steps is given by a step indicator 105 and the distance traversed per step is determined by a frequency dividing ratio indicator 103 and a counter 104.

Figure 31:
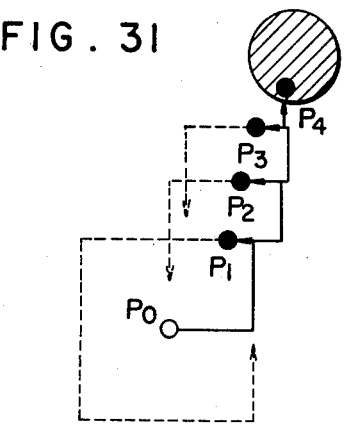
FIG. 31 is a diagram useful for explaining the operation of the circuit in FIG. 30.

If the incapability of insertion in the z-direction is detected by the sensor when the initial position of the shaft is at $P_o$ in FIG. 31, the drive circuits 98 and 99 cause the positioning mechanism to start the search motion along the search pattern written in the search pattern generator 97. When the inserting operation is initiated after the positioning mechanism has moved from $P_o$ to $P_1$, the searching operation is stopped and the inserting operation is continued until the object is restricted in the z-direction. The process of the progress of insertion is supervised by counting the z-axis drive pulses by the frequency dividing ratio indicator 103. When the object is restricted in the inserting motion at a certain depth, a distance of search motion characteristic of the depth is determined by sending an instruction to change the frequency dividing ratio from the indicator 103 to the counter 104. After the determination of the distance, the search motion following the search pattern from the generator 97 is resumed. When the inserting operation is started again at $P_2$, the search motion is stopped to continue the insertion of the object until it is restricted in the z-direction. Then, a distance of search motion corresponding to the depth at the restriction is again set. Thus, the frequency dividing ratio for the counter 104 is changed to resume the search motion. In like manner, the points $P_3$ and $P_4$ are successively reached to complete the inserting operation. By reducing the size of the search pattern as the insertion depth increases, the insertion can be smoothly performed.

Figure 32:
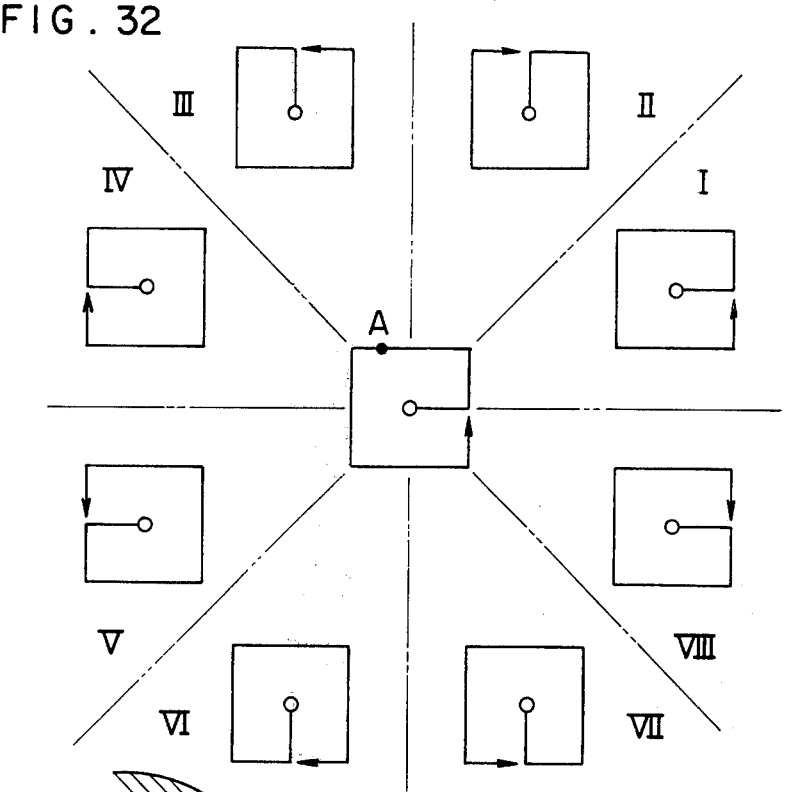
FIGS. 32 and 34 are diagram useful for explaining the operations of the circuit shown in FIG. 33.

Next, another embodiment of the present invention which can shorten the time required for the searching operation will be described. The positioning mechanism to perform the search motion is usually designed to have its drive axes parallel to those of the rectangular coordinate system and the search patterns have rectangular shapes. The center point O shown in FIG. 32 is the position initially assumed by the object. The plane is divided into eight portions as shown in FIG. 32. At first, the search motion is started along the pattern drawn in the center of the figure since there is no information indicative of the direction toward the hole. When the initiation of the inserting motion is detected by the sensor 91 at, for example, the point A, the search motion is interrupted. The fact that the inserting motion started at A, indicates that the probability that the region III contains the direct insertion area is large. Accordingly, the pattern to be selected next should be that in which the initial step is directed toward the region III. Namely, the search motion should be started from the point A along the pattern drawn in the region III, after the decrement in the inserting force has been corrected. When the next inserting motion is detected at a second point, the same selection of patterns is performed as before, with the point assumed as the center of the newly selected pattern. This method is one in which the position at which the search motion is started is compared with that at which the inserting motion is initiated so that an appropriate pattern is determined.

Figure 33:
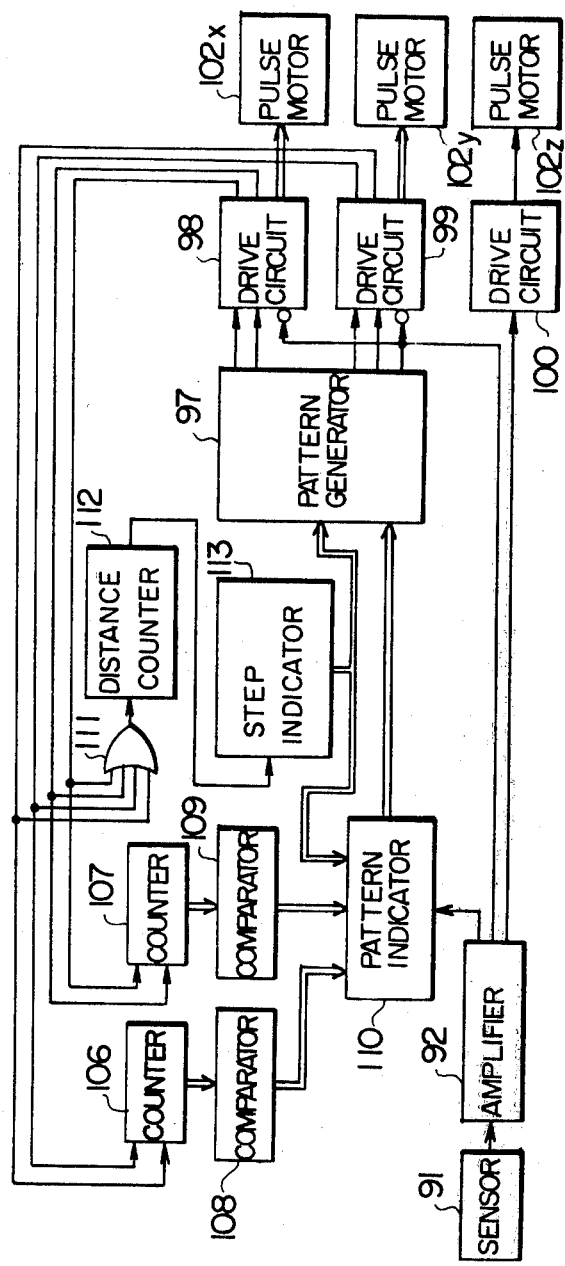
FIG. 33 is a block diagram of another embodiment of a control circuit used in the system according to the present invention.

FIG. 33 shows another embodiment of the present invention. Such patterns as shown in FIG. 32 are written in the search pattern generator 97, which performs the selecting operation in accordance with the input thereto. The generator 97 receives as its inputs the pattern indicating signal from a pattern indicator 110 and the signal from a step indicator 113 indicating which step to use to start the pattern in question (a pattern consists of nine steps). Each step is identified by counting the drive pulses from a distance counter 112. By observing the outputs of displacement counters 106 and 107 and comparators 108 and 109, the location of the points at which the inserting motion is started (for example $(+x_1, -y)$) can be known with respect to the point at which the searching motion is initiated. When the initiation of the inserting motion is detected by the sensor 91, the searching motion in the x- or y-direction is interrupted to select a new suitable pattern by the search pattern indicator 110 in accordance with the location of the point at which the inserting motion is started (also referred to for brevity as the point of inserting motion) relative to the point at which the search motion is initiated (also referred to for brevity as the point of search motion) and in accordance with the number of the already followed steps of the old pattern.

Figure 34:
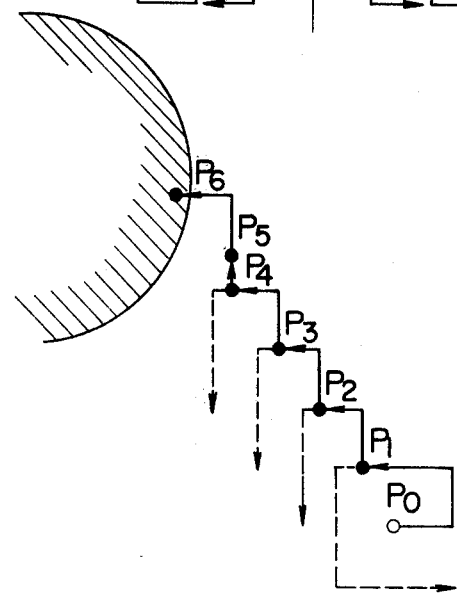

The process of inserting the object into the hole after the proper positioning of the object relative to the hole has been completed by some means or other, is as follows. If the incapability of insertion in the z-direction is detected by the sensor when the object is initially situated at the point $P_o$ in FIG. 34, the search pattern generator 97 in FIG. 33 selectively actuates the drive circuits in accordance with the pattern, e.g., the pattern I shown in FIG. 32, indicated by the search pattern indicator 110 so that the positioning mechanism is subjected to the search motion. When the inserting motion is initiated at the point $P_1$, which is situated at $(-x_1, +y_2)$ with respect to the point $P_o$ of search motion, the search pattern indicator 110 instructs the search pattern generator 97 to generate the pattern III shown in FIG. 32 and also restores the other circuits to the initial states so that the inserting motion is continued until the object is restricted in the z-direction is detected by the sensor, the inserting motion is stopped to start the searching motion at the point $P_1$. The search motion follows the pattern III shown in FIG. 32. When the inserting motion is again initiated at the point $P_2$, which is located at $(-x_2, +y_2)$ with respect to the point $P_1$ of search motion, the pattern III is reselected by the indicator 110 and at the same time the other circuits are restored to their initial states so that the inserting operation is continued until the object is restricted in the z-direction. In like manner, the points $P_3$, $P_4$, $P_5$ and $P_6$ are successively reached to complete the inserting operation. In this case, as shown with the path traced in the search motion in FIG. 34, no redundant motion is performed in searching the proper position of insertion, except in the initial stage.

Next, a description is made of another embodiment of the present invention which can shorten the time and distance required in the searching motion before the completion of insertion.

Figure 35:
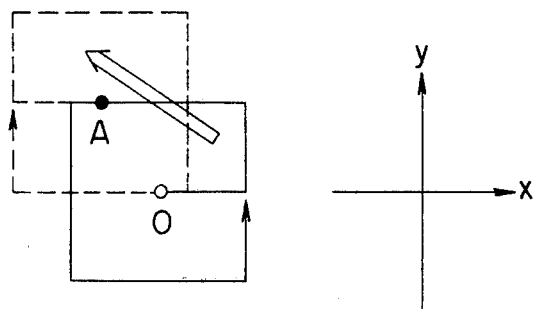
FIGS. 35 and 36 illustrate search paths and associated search patterns.
Figure 36:
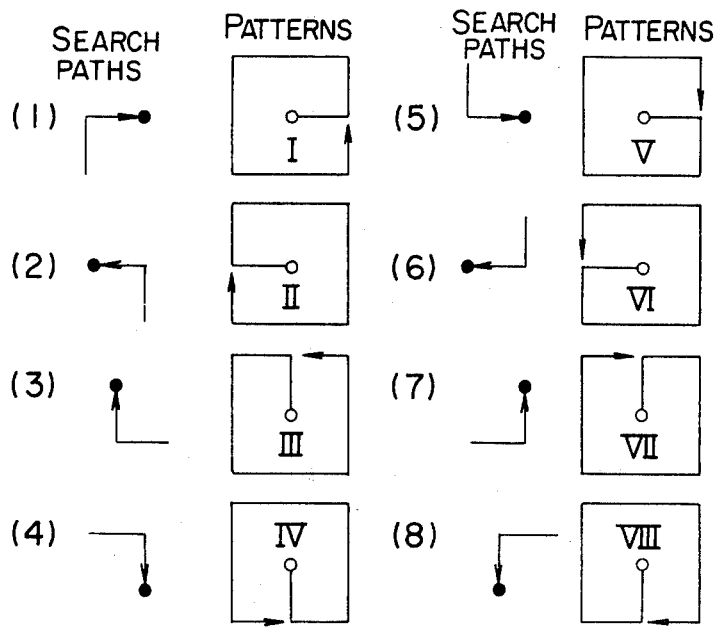

As described before, the positioning mechanism to perform the searching operation is usually designed in such a manner that it is driven in a rectangular coordinate system, so that the search patterns are all rectangular in this case, too. The point O in FIG. 35 is the position at which the object to be inserted is initially located. In the begining of search motion, there is no information indicating the direction of the hole to be reached and the search motion is started along the pattern having the point O as its center. When the initiation of the inserting motion is detected by the sensor at, for example, the point A, the search motion is interrupted. The fact that the inserting motion first took place at the point A indicates that the probability of finding the hole is the greatest in the direction opposite to the search path already followed as viewed from the point A. Accordingly, in order to perform the most effective search motion, it is necessary to select a pattern whose initial path leads to the direction to give the greatest probability, as indicated by a thick arrow in FIG. 35. Namely, the search motion should be performed, after the decrement in the inserting force has been corrected, according to, for example, a pattern indicated by dotted line in FIG. 35 and having the point A as its center. When the next inserting motion is detected at a second point, the same selection of patterns is performed as before, with the second point assumed as the center of the newly selected pattern. Thus, this embodiment is a control system in which the selection of a preferable pattern to be newly selected depends upon the path (or step) leading to the point of inserting motion. FIG. 36 shows the patterns and the associated search paths, according to this embodiment.

Figure 37:
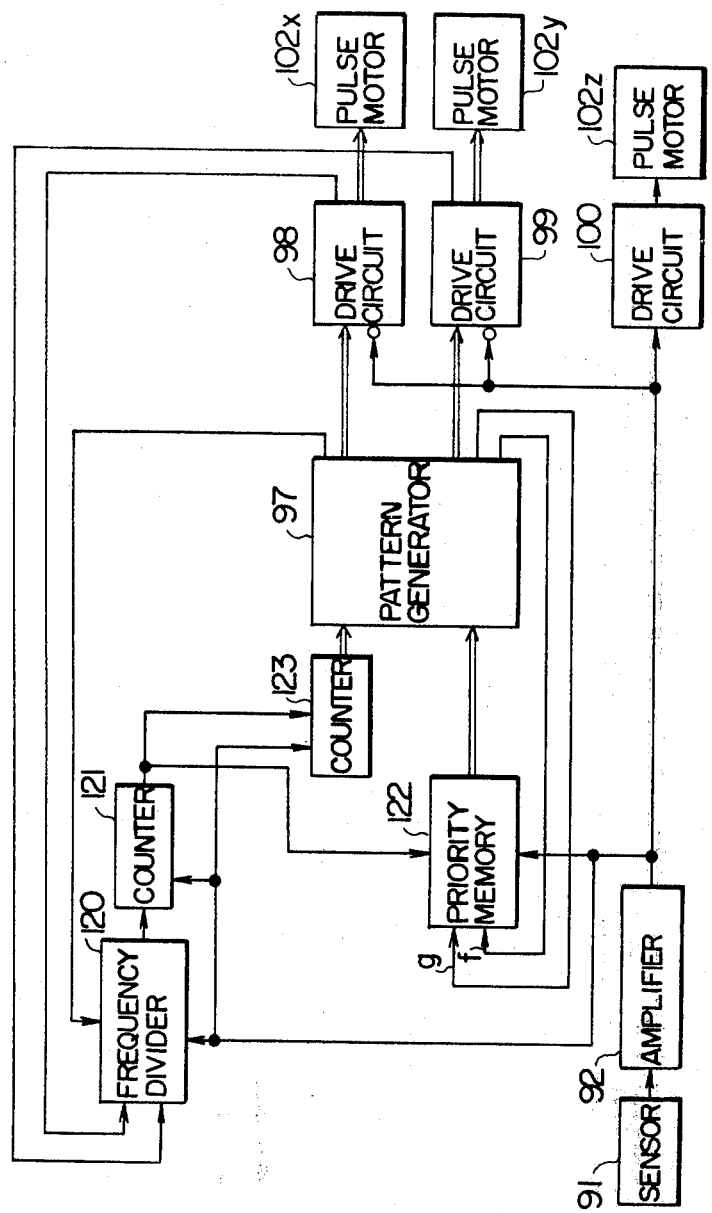
FIGS. 37, 38 and 39 are block diagrams of other embodiments of a control circuit used in the system according to the present invention.

FIG. 37 shows a control circuit as another embodiment of the present invention. The search pattern generator 97, in which such patterns as shown in FIG. 36 are written, serves to select a preferable pattern in accordance with the output of a priority memory 122 for memorizing the priority of the searching displacement in the $x$- or $y$-direction. The priority memory 122 processes the information $g$ of drive axes (e.g. $x$-axis: 0, $y$-axis: 1) and the information $f$ of directions (e.g. positive direction: 0, negative direction: 1), derived from the generator 97 in accordance with the output of the sensor 91. The displacement per step in the $x$- or $y$-direction can be determined by controlling the width of the pulse to drive the pulse motor 102$x$ or 102$y$ by a frequency divider 120 and by counting a predetermined number of such pulses by a counter 121. After the displacement in the $x$- or $y$-direction, the content of the priority memory is renewed and the content of a counter 123 is increased by unity. Since the count value of the counter 123 corresponds to the number of steps of pattern, the change in the count value causes the change in the direction of the displacement.

The time required for the search motion can be shortened also by making the speed of the search motion variable. However, the search motion especially after the completion of positioning is a delicate process followed by the inserting operation and since the flexible mechanism exists between the positioning mechanism and the holding mechanism, the movement of the positioning mechanism cannot be completely traced by that of the lower end of the shaft. If the speed of the search motion is increased, the degree of the mistracing, i.e., the deviation of the lower end of the shaft from the positioning mechanism, is also increased. This will cause the increase in $F_x$ and therefore the speed of the search motion cannot be increase so much. On the other hand, before the completion of positioning, i.e., in the searching process before the first point of inserting motion has been reached, no inconvenience is caused due to the increase in the searching speed. Moreover, in this process, the distance covered in the search motion tends to be great and it is necessary to make the speed of the search motion before the completion of positioning as fast as possible. The shortening of the time required for the search motion by making the speed variable as described above will contribute much to the improvement in the efficiency of the system.

Figure 38:
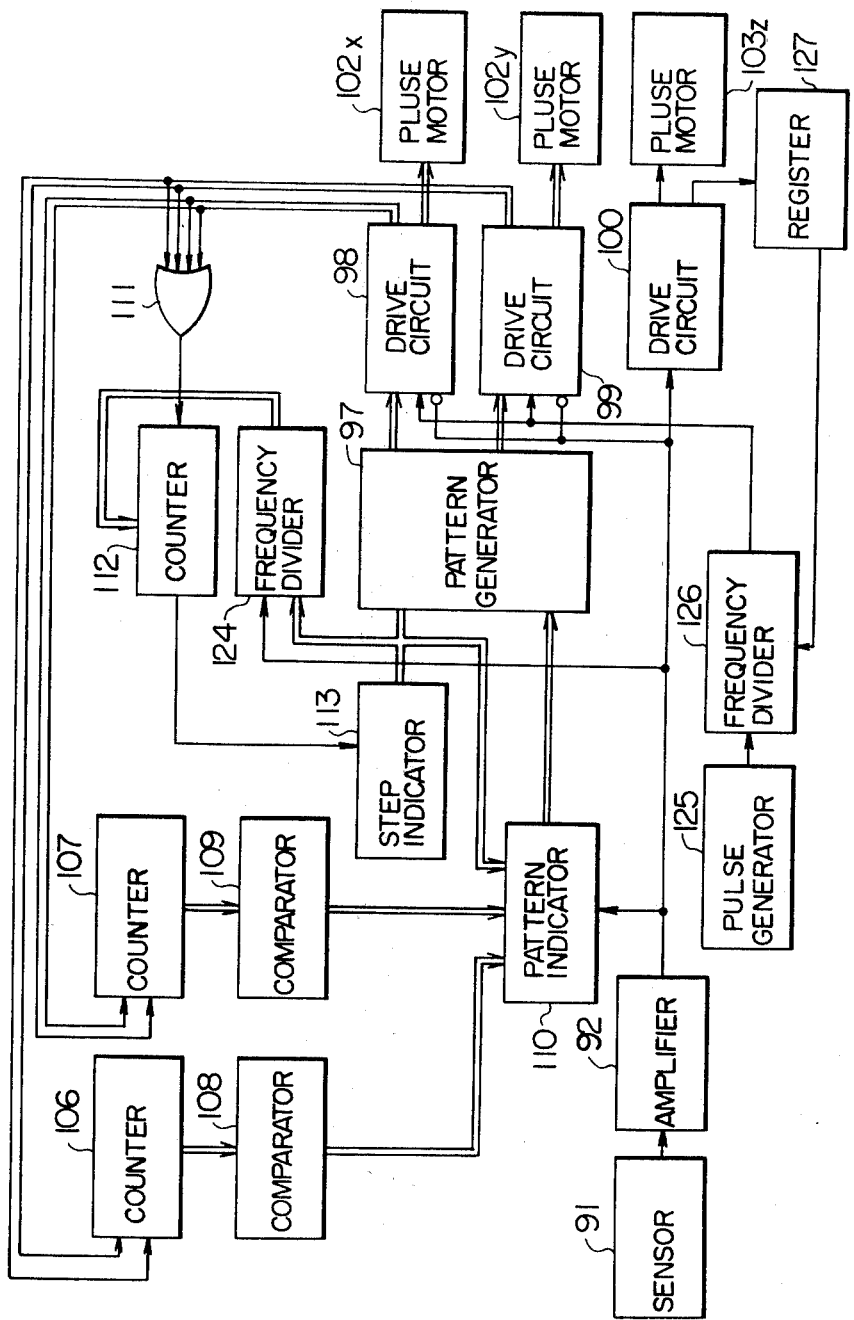

FIG. 38 shows an example of a control circuit which can change the speed of the search motion. DRive pulses generated by a pulse generator 125 are applied through a frequency divider 126 to the drive circuits 98 and 99 which are controlled by the output of the search pattern generator 97. The drive circuit 100 incorporates therein a pulse generator and is controlled by the output of the sensor 91. The generator 97 has the patterns as shown in FIG. 32 written therein and selects a suitable pattern in accordance with the input thereto. Namely, the generator 97 receives as its inputs the pattern indicating signal from the pattern indicator 110 and the signal from the step indicator 113 indicating which step to use to start the pattern in question (a pattern consists of nine steps). The pattern indicator 110 checks the inserting process by observing the outputs of the displacement counters 106 and 107, the outputs of the comparators 108 and 109, and the number of the already followed steps and then selects a new pattern. A register 127 serves to measure the depth of insertion.

The operation of this circuit in FIG. 38 will be described with the aid of FIG. 28. Let it be first assumed that the object to be inserted is initially located at the point $P_o$. Then, since $P_o$ is outside the direct insertion area, the positioning operation must first be performed. In this case, whether the position of the object is outside the direct insertion area or not, is checked by the register 127. The positioning mechanism is moved along the pattern generated by the search pattern generator 97, which pattern has its center at $P_o$. Before the first point of inserting operation is reached, that is, before the completion of positioning is detected by the register 127, the speed indicator causes the frequency divider 126 to determine the frequency of the drive pulses for the pulse motors 102x and 102y in such a manner that the searching operation is performed at a speed faster than the searching speed after the first point of inserting motion has been reached. If the positioning is not completed after the first selected pattern has been entirely followed, the frequency divider 124 determines a new frequency dividing ratio for the distance counter 112 so as to cause the generator 97 to generate a new pattern having a larger size, as shown in FIG. 28. When the positioning is completed at $P_1$, the search pattern to be used next is restored to the initial size and the speed of the successive search motion is slowed down. After the completion of the positioning, a pattern to increase the depth of insertion is generated through the combined function of the search pattern indicator 110 and the search pattern generator 97 so that the path $P_1 - P_2 - P_3 - P_4$ is successively followed to complete the inserting operation. In this way, the time for search motion is effectively shortened even in the case where there is initially a large distance between the object and the hole.

Another artifice to shorten the time required for the searching operation will be described below in which the search motion is linearly advanced toward the direct insertion area. This artifice to follow the shortest path is hereafter called the vectorical searching method. In order to detect the vectorical searching direction and therefore the direction of the direct insertion area, two points of inserting motion must be known. Accordingly, in the initial stage of the search motion, only a very small area about the initial position is searched. As a result of this small-area searching operation, the vectorical searching direction can be detected. It should here be noted that since the vectorical searching direction is not always coincident with the direction of the direct insertion area, the positioning mechanism may become remoter from the direct insertion area as the search motion progresses. In order to eliminate this counteraction, the distance of the vectorical searching is made constant and if the inserting motion cannot be continued after the constant distance searching, the search motion about the position is resumed. This search motion gives another vectorical searching direction. Thus, the inserting operation is advanced, the vectorical searching direction being corrected when the object recedes from the direct insertion area.

Therefore, this method makes it possible to perform the searching operation along the shortest path by combining the vectorical searching with the searching for detecting the vectorical searching direction (basic searching).

Figure 39:
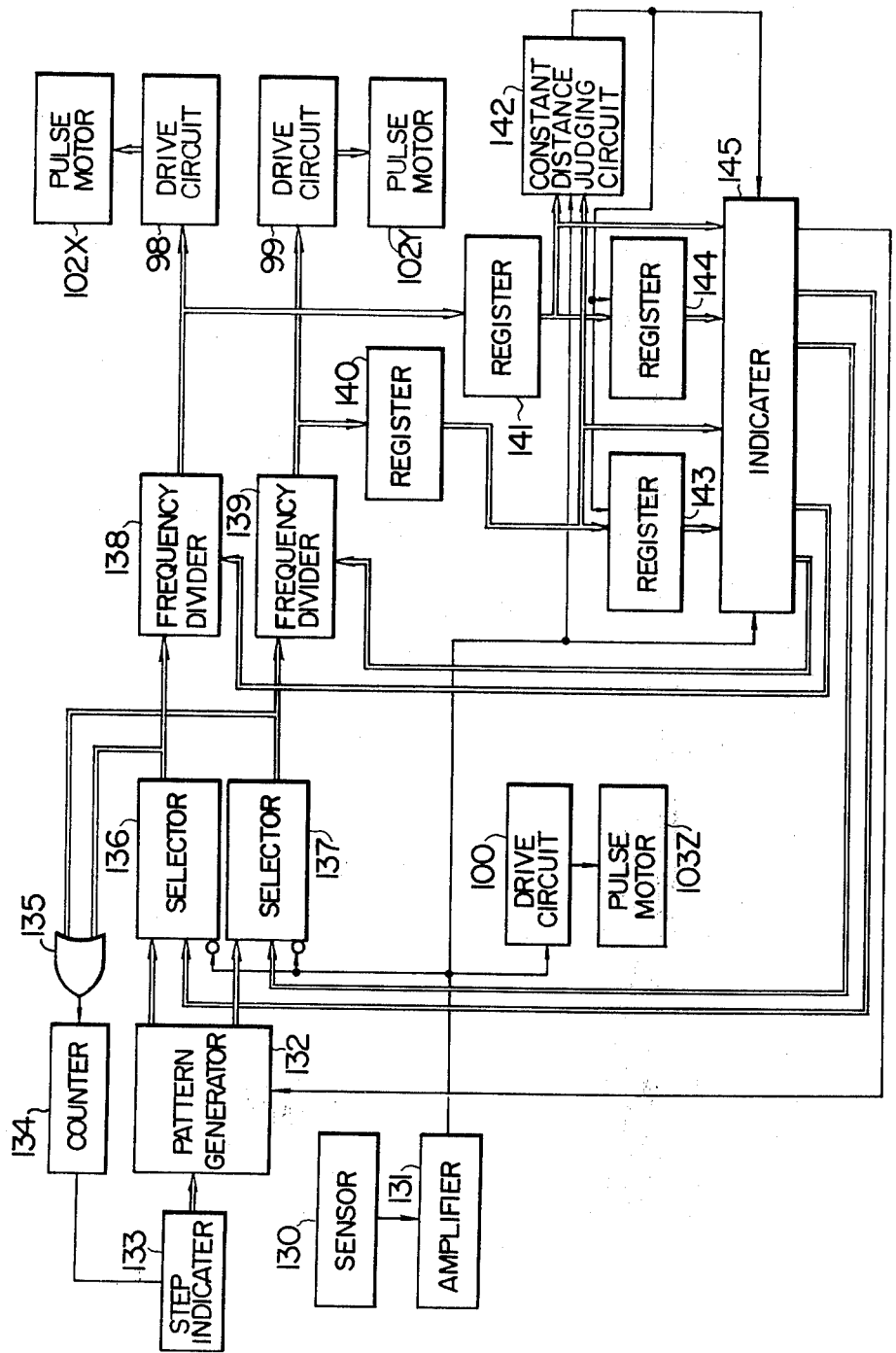

FIG. 39 shows still another embodiment of the present invention. Drive circuits 98 and 99 receive the pulses delivered by frequency divider 138 and 139 and drive the respective pulse motors. A circuit 100 consists of a pulse generator for generating pulses to drive a pulse motor 103z and of a drive circuit, and drives the pulse motor 103z in accordance with the output of a sensor 130 having a contactor (a circuit 131 is that which processes the output of the sensor 130). Position registers 140 and 141 indicate the present position of the positioning mechanism by counting the pulses delivered from frequency dividers 138 and 139. The outputs of the position registers 140 and 141 are applied to a constant distance judging circuit 142, which judges the search distance covered by the vectorical search motion. A drive direction indicator 145 receives the outputs of the position registers 140, 141, 143 and 144, the circuit 142 and the sensor 130, indicates the frequency dividing ratio for the frequency dividers 138 and 139, and indicates the directions of driving the motors for selectors 136 and 137. Basic patterns such as a square pattern shown in FIG. 8a are previously written in a basic pattern generator 132. The distance covered by one step of the search motion is identified by a counter 134, the output of which is fed to a step indicator 133. In accordance with the output of the step indicator 133, the basic pattern generator 132 indicates the directions of driving the motors for the selectors 136 and 137. The selectors 136 and 137 incorporate therein pulse generators to drive the motors.

The control of the inserting operation after the shaft has been properly positioned with respect to the hole by some means or other, will be described with the aid of FIG. 40.

If the incapability of inserting motion in the z-direction is detected by the sensor 130 when the initial position of the object to be inserted is at $P_o$, the positioning mechanism is subjected to the search motion starting at $P_o$, along the basic search pattern written in the basic pattern generator 132. When the inserting motion is initiated at $P_1$, the search motion is interrupted and the contents of the position registers 140 and 141 are taken into the drive direction indicator 145. The vectorical searching direction is given by the indicator 145 and the frequency dividing ratios, i.e., speed ratios, for the vectorical search motion are fed to the frequency dividers 138 and 139 so that the selectors 136 and 137 are caused to indicate the directions of driving the motors while the basic pattern generator 132 is reset. Simultaneous with this processing, the inserting motion is continued until the restriction in the z-direction is sensed. Upon detection of the restriction, the positioning mechanism is shifted along the direction (or sense) of the vector $\overrightarrow{P_oP_1}$ determined by the drive direction indicator 145. It should here be noted that the initiation of the vectorical searching must be preceded by the completion of the above mentioned processing. In this vectorical searching, if the depth of insertion increases up to a certain value, the direction (or sense) of the vector $\overrightarrow{P_2P_3}$ is maintained. If the inerting motion makes no progress even after the point $P_4$ has been reached, the contents of the position registers 140 and 141 are set into the position registers 143 and 144 to generate a basic search pattern at $P_4$. Let it be assumed that the inserting motion is again started at $P_5$ while the positioning mechanism is following the basic search pattern. Then, the position registers 143 and 144 stores therein the position $(x_4, y_4)$ of the point $P_4$ while the registers 140 and 141 has the position $(x_5, y_5)$ of the point $P_5$. The contents of these position registers are taken into the drive direction indicator 145, a new direction for vectorical searching determined by the positions $(x_4, y_4)$ and $(x_5, y_5)$ is obtained, the speed ratios for the vectorical searching motion are fed to the frequency dividers 138 and 139, and the basic search pattern generator is reset while the selectors 136 and 137 are caused to indicate the directions of driving the motors. Simultaneous with this processing, the search motion is interrupted and the inserting motion is advanced until the restriction in the z-direction is sensed. Upon detection of the restriction, the positioning mechanism is shifted along the direction (or sense) of the vector $\overrightarrow{P_4P_5}$ indicated by the drive direction indicator. In this way, the search motion and the inserting motion are repeated until the insertion is completed at $P_6$.

In the searching operation along the path II, the search motion is started at $P_7$ in accordance with the basic search pattern, as in the searching along the path I, and the direction (or sense) of the vector $\overrightarrow{P_7P_8}$ is obtained. Then, the positioning mechanism is moved along the direction and the searching and inserting operations are repeated until the insertion is completed at $P_{12}$.

In the searching operation along the path III, the searching is started at $P_{13}$ along the basic search pattern, as in the searching along the path I, and the direction (or sense) of the vector $\overrightarrow{P_{13}P_{14}}$ is obtained. Then, the positioning mechanism is driven in the direction indicated by the vector $\overrightarrow{P_{13}P_{14}}$ and the searching and inserting motions are repeated until the insertion of the object into the hole is finished.

As described above, if the positioning mechanism is moved linearly toward the direct insertion area, the inserting operation can be finished by the search motion along the shortest path so that the time required for the inserting operation can be considerably shortened.

Figure 40:
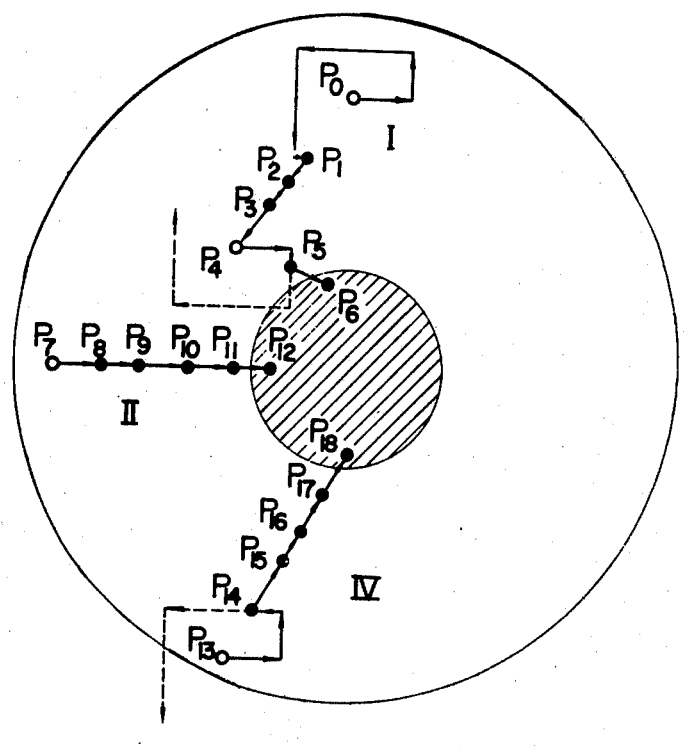
FIG. 40 is a diagram useful for explaining the operation of the control circuit shown in FIG. 39.

In FIG. 40, the shaded area is the direct insertion area and the area within the larger circle is the indirect insertion area. If the shaft is in the direct insertion area, it can be inserted to full depth into the hole without any correction of the position of the shaft by means of the positioning mechanism while if the shaft is outside the direct insertion area and within the indirect insertion area, it can be inserted completely into the hole only after the correction of the position is made by the positioning mechanism.

In conclusion, the present invention provides an automatic assembly control system which can effectively insert minute parts or inexactly positioned parts in their proper holes and it has a great industrial merit worthy of patentability.

We claim:

1. An automatic assembly control system for inserting an object into a hole, comprising
   a holding mechanism for holding said object;
   a positioning mechanism for actuating drive means along the axes of an arbitrary coordinate system;

a flexible mechanism for flexibly coupling said holding mechanism to said positioning mechanism so that said holding and positioning mechanisms may shift in the direction of insertion and in the direction perpendicular to the direction of insertion; and a detecting means for detecting force applied to said holding mechanism in the direction of insertion, wherein said object is positioned approximately at the center of said hole by said positioning mechanism and then the inserting operation is performed by applying force below a predetermined value to said object in the direction of insertion, wherein when the restriction of said object in said direction of insertion is detected, a search motion in the direction perpendicular to said direction of insertion is performed to find a position where said restriction is released, and wherein the inserting operation with said force below said predetermined value is again performed at said position.

2. An automatic assembly control system as claimed in claim 1, wherein a means for generating predetermined threshold values and a means for comparing the output of said detector with said threshold value are additionally provided to obtain an on-off signal corresponding to the amount of said deformation.

3. An automatic assembly control system as claimed in claim 2, further comprising a means for changing the output of said threshold value generating means in accordance with an external signal.

4. An automatic assembly control system as claimed in claim 2, wherein said threshold value generating means selectively generates said threshold values in accordance with the information of said object.

5. An automatic assembly control system as claimed in claim 1, further comprising a plurality of detectors for detecting the deformations of said flexible mechanism in the direction of insertion, said detectors being so disposed to be turned on or off in accordance with the different conditions corresponding to said deformations.

6. An automatic assembly control system as claimed in claim 5, further comprising a control means for controlling said positioning mechanism in such a manner that the motion of said positioning mechanism is stopped at the position in advance by one step of the position where the output of said detector is changed.

7. An automatic assembly control system as claimed in claim 1, wherein said positioning mechanism and said holding mechanism are coupled by one or more spring means flexible substantially in the direction of insertion and by one or more spring means flexible substantially in the direction perpendicular to said direction of insertion so that said holding mechanism may be displaced by external force in both said directions with respect to said positioning mechanism and that said holding mechanism may be inclined by external force with respect to the axial line of said hole in accordance with the arrangement of said spring means.

8. An automatic assembly control system as claimed in claim 7, further comprising mechanical stopper means to keep said displacement and inclination within the respective predetermined values.

9. An automatic assembly control system as claimed in claim 7, wherein a detector for detecting said displacement and/or said inclination is provided to control said positioning mechanism in accordance with the output of said detector.

10. An automatic assembly control system as claimed in claim 1, wherein search patterns for search motion are previously prepared and said patterns are selected depending upon the positions where said positioning mechanism starts inserting operation.

11. An automatic assembly control system as claimed in claim 1, wherein search patterns for search motion are previously prepared and said patterns are selected depending upon the path of said search motion.

12. An automatic assembly control system as claimed in claim 1, wherein search patterns for search motion are successively reduced in size.

13. An automatic assembly control system as claimed in claim 1, wherein the size of search pattern is successively enlarged in the process of searching said hole and said pattern is restored to its original size after the completion of search motion.

14. An automatic assembly control system as claimed in claim 1, wherein the searching speed is changed depending upon the steps of search motion.

15. An automatic assembly control system as claimed in claim 1, wherein the direction of the path of search motion is made variable.

* * * * *